US008453027B2

(12) United States Patent
Bartz et al.

(10) Patent No.: US 8,453,027 B2
(45) Date of Patent: May 28, 2013

(54) SIMILARITY DETECTION FOR ERROR REPORTS

(75) Inventors: Kevin Bartz, Cambridge, MA (US); Jack Wilson Stokes, III, North Bend, WA (US); Ryan S. Kivett, Redmond, WA (US); David G. Grant, Duvall, WA (US); Gretchen L. Loihle, Redmond, WA (US); Silviu C. Calinoiu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 12/561,608

(22) Filed: Sep. 17, 2009

(65) Prior Publication Data

US 2011/0066908 A1    Mar. 17, 2011

(51) Int. Cl.
*G06F 11/07* (2006.01)
*G06F 11/20* (2006.01)

(52) U.S. Cl.
USPC .......................................... 714/746; 714/799

(58) Field of Classification Search
None
See application file for complete search history.

(56) References Cited

U.S. PATENT DOCUMENTS

| 6,681,344 | B1 | 1/2004 | Andrew |
| 6,742,141 | B1 | 5/2004 | Miller |
| 7,363,615 | B2 | 4/2008 | Krishnaswamy et al. |
| 7,802,145 | B1 * | 9/2010 | Bainbridge et al. ......... 714/38.1 |
| 2007/0157035 | A1 * | 7/2007 | Gumma et al. ............... 713/300 |
| 2007/0283338 | A1 * | 12/2007 | Gupta et al. .................. 717/154 |

OTHER PUBLICATIONS

Bartz et al., "Finding Similar Failures Using Callstack Similarity," Workshop on Tackling Computer Systems Problems with Machine Learning Techniques (SysML08), San Diego, CA 2008, 6 pages.
Bocek et al., "Fast Similarity Search in Peer-to-Peer Networks," *Network Operations and Management Symposium*, pp. 240-247 (2008) http://www.globis.ethz.ch/script/publication/download-?docid=506, downloaded Jun. 29, 2009.
Brodie, et al., "Automated Problem Determination Using Call-Stack Matching," *Journal of Network and Systems Management* 13(2):219-237 (2005).

(Continued)

*Primary Examiner* — Ajay Bhatia
*Assistant Examiner* — Dipakkumar Gandhi
(74) *Attorney, Agent, or Firm* — Chin IP, PLLC; Davin Chin

(57) ABSTRACT

Techniques for determining similarity between error reports received by an error reporting service. An error report may be compared to other previously-received error reports to determine similarity and facilitate diagnosing and resolving an error that generated the error report. In some implementations, the similarity may be determined by comparing frames included in a callstack of an error report to frames included in callstacks in other error reports to determine an edit distance between the callstacks, which may be based on the number and type of frame differences between callstacks. Each type of change may be weighted differently when determining the edit distance. Additionally or alternatively, the comparison may be performed by comparing a type of error, process names, and/or exception codes for the errors contained in the error reports. The similarity may be expressed as a probability that two error reports were generated as a result of a same error.

20 Claims, 12 Drawing Sheets

OTHER PUBLICATIONS

Brodie et al., "Quickly Finding Known Software Problems via Automated Symptom Matching," *Proc 2nd Int'l Conference on Autonomic Computing, Int'l Conference on Autonomic Computing (ICAC)* pp. 101-110, (2005) http://ieeexplore.ieee.org/stamp/stamp.jsp?arnumber=01498056, downloaded Jun. 22, 2009.

Chen et al., "Pinpoint: Problem Determination in Large, Dynamic Internet Services," http://roc.cs.berkeley.edu/papers/roc-pinpoint-ipds.pdf, downloaded Jun. 29, 2009.

Ding et al., "Automatic Software Fault Diagnosis by Exploiting Application Signatures," *Proc 22nd Large Installation System Administration Conference (LISA '08)*, San Diego, California, USENIX Association, Nov. 9-14, 2008, http://www.usenix.org/events/lisa08/tech/full_papers/ding/ding_html/, downloaded Jun. 23, 2009.

Francis et al., "Tree-Based Methods for Classifying Software Failures," *Proc 15th Int'l Symposium on Software Reliability Engineering (ISSRE '04)*, http://ieeexplore.ieee.org/stamp/stamp.jsp?arnumber=01383139, downloaded Jun. 22, 2009.

Gusfield, D., "Algorithms on Strings, Trees, and Sequences: Computer Science and Computational Biology," Cambridge University Press, pp. 41-60, (1997) http://portal.acm.org/ft_gateway.cfm?id=571472&type=pdf&coll=GUIDE&dl=GUIDE&CFID=42336784&CFTOKEN=13674140, downloaded Jun. 29, 2009.

Lange, K., *Numerical Analysis for Statisticians*, Springer-Verlag, New York, NY, (2001), pp. 185-187.

Levenshtein, V.I., "Binary Codes Capable of Correcting Deletions, Insertions, and Reversals," *Soviet Physics—Doklady* 10(8): 707-710 (1966), http://sascha.geekheim.de/wp-content/uploads/2006/04/levenshtein.pdf, downloaded Jun. 29, 2009.

McCullagh et al., *Generalized Linear Models*, 2nd ed., Chapman & Hall, 1989, pp. 114-115 and 248-249.

Mao, Y., "Automated Computer System Diagnosis by Machine Learning Approaches," http://www.research.att.com/~maoy/tr-05.pdf, pp. 1-31, downloaded Jun. 19, 2009.

Marzal et al., "Computation of Normalized Edit Distance and Applications," *IEEE Trans. on Pattern Analysis and Machine Intelligence* 15(9):926-932 (Sep. 1993), http://ieeexplore.ieee.org/stamp/stamp.jsp?tp=&arnumber=232078&isnumber=6001, downloaded Jun. 29, 2009.

Modani at al., Automatically Identifying Known Software Problems, *ICDE Workshops*, pp. 433-441 (2007) http://ieeexplore.ieee.org/stamp/stamp.jsp?tp=&arnumber=4401026&isnumber=4400943, downloaded Jun. 22, 2009.

Nelder et al., "A simplex method for function minimization," *Computer Journal* 7:308-313 (1965), downloaded Jun. 29, 2009.

Podgurski et al., "Automated Support for Classifying Software Failure Reports," http://www.cs.aub.edu.lb/wm13/ICSE2003.pdf, downloaded Jun. 29, 2009.

Ristad et al., "Learning String-Edit Distance," *IEEE Trans. on Pattern Analysis and Machine Intelligence* 20(5):522-532 (1998), http://ieeexplore.ieee.org/stamp/stamp.jsp?arnumber=00682181, downloaded Jun. 22, 2009.

Yuan et al., "Automated Known Problem Diagnosis with Event Traces," *EuroSys '06*, Apr. 18-21, 2006, Leuven, Belgium, pp. 375-388, http://research.microsoft.com/en-us/um/people/jrwen/jrwen_files/publications/eurosys.pdf, downloaded Jun. 29, 2009.

* cited by examiner

FIG. 4A

| Module | Function | Offset |
|---|---|---|
| kernel32 | ByteCallback | 0x3 |
| kernel32 | WideCharExpand | 0x2 |
| kernel32 | MultiByteToWideChar | 0x9 |
| A3DHF8Q | --- | 0x3820523 |
| A3DHF8Q | --- | 0x3723952 |
| A3DHF8Q | --- | 0x3945323 |
| kernel32 | ProcUserText | 0x4 |
| user32 | TextDecode | 0x4096 |
| user32 | ReadDialog | 0x4096 |
| user32 | OpenDialog | 0x4096 |
| ntdll | RtlThreadStart | 0x0 |
| ntdll | RtlInitThreadThunk | 0x0 |

400

| Module | Function | Offset |
|---|---|---|
| kernel32 | ByteCallback | 0x3 |
| kernel32 | WideCharExpand | 0x2 |
| *kernel32* | *foobar* | *0x17* |
| kernel32 | MultiByteToWideChar | 0x9 |
| A3DHF8Q | --- | 0x3820523 |
| A3DHF8Q | --- | 0x3723952 |
| A3DHF8Q | --- | 0x3945323 |
| kernel32 | ProcUserText | 0x4 |
| user32 | TextDecode | 0x4096 |
| user32 | ReadDialog | 0x4096 |
| user32 | OpenDialog | 0x4096 |
| ntdll | RtlThreadStart | 0x0 |
| ntdll | RtlInitThreadThunk | 0x0 |

| Module | Function | Offset |
|---|---|---|
| kernel32 | ByteCallback | 0x3 |
| kernel32 | WideCharExpand | 0x2 |
| kernel32 | MultiByteToWideChar | 0x9 |
| A3DHF8Q | --- | 0x3820523 |
| A3DHF8Q | --- | 0x3723952 |
| A3DHF8Q | --- | 0x3945323 |
| kernel32 | ProcUserText | 0x4 |
| user32 | TextDecode | 0x4096 |
| user32 | ReadDialog | 0x4096 |
| user32 | OpenDialog | 0x4096 |
| ntdll | RtlThreadStart | 0x0 |
| ntdll | RtlInitThreadThunk | 0x0 |

400

| Module | Function | Offset |
|---|---|---|
| kernel32 | ByteCallback | 0x3 |
| kernel32 | WideCharExpand | 0x2 |
| kernel32 | MultiByteToWideChar | 0x9 |
| A3DHF8Q | --- | 0x3820523 |
| A3DHF8Q | --- | 0x3723952 |
| A3DHF8Q | --- | 0x3945323 |
| *foobar* | *widget* | *0x17* |
| kernel32 | ProcUserText | 0x4 |
| user32 | TextDecode | 0x4096 |
| user32 | ReadDialog | 0x4096 |
| user32 | OpenDialog | 0x4096 |
| ntdll | RtlThreadStart | 0x0 |
| ntdll | RtlInitThreadThunk | 0x0 |

| Module | Function | Offset |
|---|---|---|
| kernel32 | ByteCallback | 0x3 |
| kernel32 | WideCharExpand | 0x2 |
| kernel32 | MultiByteToWideChar | 0x9 |
| A3DHF8Q | --- | 0x3820523 |
| A3DHF8Q | --- | 0x3723952 |
| A3DHF8Q | --- | 0x3945323 |
| kernel32 | ProcUserText | 0x4 |
| user32 | TextDecode | 0x4096 |
| user32 | ReadDialog | 0x4096 |
| user32 | OpenDialog | 0x4096 |
| ntdll | RtlThreadStart | 0x0 |
| ntdll | RtlInitThreadThunk | 0x0 |

406

| Module | Function | Offset |
|---|---|---|
| kernel32 | ByteCallback | 0x3 |
| kernel32 | WideCharExpand | 0x2 |
| kernel32 | MultiByteToWideChar | 0x9 |
| A3DHF8Q | --- | 0x3820523 |
| A3DHF8Q | --- | 0x3723952 |
| A3DHF8Q | --- | 0x3945323 |
| kernel32 | ProcUserText | 0x4 |
| user32 | TextDecode | 0x4096 |
| user32 | ReadDialog | 0x4096 |
| user32 | OpenDialog | 0x4096 |
| ntdll | RtlInitThreadThunk | 0x0 |

| Module | Function | Offset |
|---|---|---|
| kernel32 | ByteCallback | 0x3 |
| kernel32 | WideCharExpand | 0x2 |
| kernel32 | MultiByteToWideChar | 0x9 |
| A3DHF8Q | --- | 0x3820523 |
| A3DHF8Q | --- | 0x3723952 |
| A3DHF8Q | --- | 0x3945323 |
| kernel32 | ProcUserText | 0x4 |
| user32 | TextDecode | 0x4096 |
| user32 | ReadDialog | 0x4096 |
| user32 | OpenDialog | 0x4096 |
| ntdll | RtlInitThreadThunk | 0x0 |

408

| Module | Function | Offset |
|---|---|---|
| kernel32 | ByteCallback | 0x3 |
| kernel32 | WideCharExpand | 0x2 |
| kernel32 | MultiByteToWideChar | 0x9 |
| A3DHF8Q | --- | 0x3820523 |
| A3DHF8Q | --- | 0x3723952 |
| A3DHF8Q | --- | 0x3945323 |
| kernel32 | ProcUserText | 0x4 |
| user32 | TextDecode | 0x4096 |
| user32 | ReadDialog | 0x4096 |
| user32 | OpenDialog | 0x4096 |

| Module | Function | Offset |
|---|---|---|
| kernel32 | ByteCallback | 0x3 |
| kernel32 | WideCharExpand | 0x2 |
| kernel32 | MultiByteToWideChar | 0x9 |
| A3DHF8Q | --- | 0x3820523 |
| A3DHF8Q | --- | 0x3723952 |
| A3DHF8Q | --- | 0x3945323 |
| kernel32 | ProcUserText | 0x4 |
| user32 | TextDecode | 0x4096 |
| user32 | ReadDialog | 0x4096 |
| user32 | OpenDialog | 0x4096 |
| ntdll | RtlThreadStart | 0x0 |
| ntdll | RtlInitThreadThunk | 0x0 |

410

| Module | Function | Offset |
|---|---|---|
| kernel32 | ByteCallback | 0x3 |
| kernel32 | WideCharExpand | 0x2 |
| *foobar* | *MultiByteToWideChar* | *0x9* |
| A3DHF8Q | --- | 0x3820523 |
| A3DHF8Q | --- | 0x3723952 |
| A3DHF8Q | --- | 0x3945323 |
| kernel32 | ProcUserText | 0x4 |
| user32 | TextDecode | 0x4096 |
| user32 | ReadDialog | 0x4096 |
| user32 | OpenDialog | 0x4096 |
| ntdll | RtlThreadStart | 0x0 |
| ntdll | RtlInitThreadThunk | 0x0 |

| Module | Function | Offset |
|---|---|---|
| kernel32 | ByteCallback | 0x3 |
| kernel32 | WideCharExpand | 0x2 |
| kernel32 | MultiByteToWideChar | 0x9 |
| A3DHF8Q | --- | 0x3820523 |
| A3DHF8Q | --- | 0x3723952 |
| A3DHF8Q | --- | 0x3945323 |
| kernel32 | ProcUserText | 0x4 |
| user32 | TextDecode | 0x4096 |
| user32 | ReadDialog | 0x4096 |
| user32 | OpenDialog | 0x4096 |
| ntdll | RtlThreadStart | 0x0 |
| ntdll | RtlInitThreadThunk | 0x0 |

412

| Module | Function | Offset |
|---|---|---|
| kernel32 | ByteCallback | 0x3 |
| kernel32 | WideCharExpand | 0x2 |
| *kernel32* | *foobar* | *0x9* |
| A3DHF8Q | --- | 0x3820523 |
| A3DHF8Q | --- | 0x3723952 |
| A3DHF8Q | --- | 0x3945323 |
| kernel32 | ProcUserText | 0x4 |
| user32 | TextDecode | 0x4096 |
| user32 | ReadDialog | 0x4096 |
| user32 | OpenDialog | 0x4096 |
| ntdll | RtlThreadStart | 0x0 |
| ntdll | RtlInitThreadThunk | 0x0 |

400

| Module | Function | Offset |
|---|---|---|
| kernel32 | ByteCallback | 0x3 |
| kernel32 | WideCharExpand | 0x2 |
| kernel32 | MultiByteToWideChar | 0x9 |
| A3DHF8Q | --- | 0x3820523 |
| A3DHF8Q | --- | 0x3723952 |
| A3DHF8Q | --- | 0x3945323 |
| kernel32 | ProcUserText | 0x4 |
| user32 | TextDecode | 0x4096 |
| user32 | ReadDialog | 0x4096 |
| user32 | OpenDialog | 0x4096 |
| ntdll | RtlThreadStart | 0x0 |
| ntdll | RtlInitThreadThunk | 0x0 |

414

| Module | Function | Offset |
|---|---|---|
| kernel32 | ByteCallback | 0x3 |
| kernel32 | WideCharExpand | 0x2 |
| *kernel32* | *MultiByteToWideChar* | *0x17* |
| A3DHF8Q | --- | 0x3820523 |
| A3DHF8Q | --- | 0x3723952 |
| A3DHF8Q | --- | 0x3945323 |
| kernel32 | ProcUserText | 0x4 |
| user32 | TextDecode | 0x4096 |
| user32 | ReadDialog | 0x4096 |
| user32 | OpenDialog | 0x4096 |
| ntdll | RtlThreadStart | 0x0 |
| ntdll | RtlInitThreadThunk | 0x0 |

SIMILARITY DETECTION FOR ERROR REPORTS

BACKGROUND

The development and release of a software product, such as operating systems or operating system components, application programs, plug-ins, and scripts, by a software vendor involves testing and quality assurance to remove errors such as inconsistencies and bugs from the software product before it is released. Testing may be based on use of the software product in an intended way and in an intended environment. Following a release of a software product, however, the software product may be used in ways that were not tested. Despite pre-release testing, then, errors may arise in the software product.

The software vendor, having an interest in releasing and supporting error-free products, may attempt to diagnose and correct the error by analyzing conditions of the software product when the error occurred. Accordingly, when a failure does occur as a result of an error, a user of the software product may be prompted to upload information about the software product and the failure to the software vendor. This information may be contained in an error report, which may contain any useful information about the circumstances of the failure of the software product, including information about the failure itself, information about the software product, and/or information about the computing device on which the software product was executing at the time of the failure. If the user consents to uploading information about the failure, an error report may be generated, uploaded to an error reporting service, and analyzed to determine an error that is the source of the failure and a solution to the error.

Examples of such error reporting services are the Windows Error Reporting (WER) service and the Online Crash Analysis (OCA) service offered as a part of the Windows® operating system available from the Microsoft® Corporation of Redmond, Wash. In the WER service, when the Windows® operating system detects that a software product has experienced a failure, the operating system may capture some information about the state of the software product and/or the operating system at the time of the failure, package the information into a WER report, and transmit the report to Microsoft® to be analyzed such that the error can be diagnosed and corrected.

Error reports may comprise various types of information regarding a failure. For example, a failure type may be included in the error report that identifies how a software product failed as a result of the error. The failure type could be a crash, a hang, or a deadlock, among others. If the failure is a crash, then the error report may also contain an exception code identifying the type of crash. Further, the error report may include information about the software product that failed, such as a process name for the executing process that failed (i.e., the instantiation of the software product that was executing at the time) and a callstack for the process.

A callstack is maintained by a computer executing a process and identifies information about a state of the computer during execution of the process. A separate callstack is maintained for each process that is run simultaneously. For example, for each function executed by the process, the callstack includes an entry (called a "frame") identifying the code module (e.g., library or file) containing the function, the function's name, and input parameters and/or output parameters that have been calculated while executing the function. When a first executing function calls a second function, a new frame is created in the callstack for the second function and a current address in memory (the "offset") for the first function, the address at which the instruction to execute the second function is located, is stored in the frame for the first function. When a function is completed, its frame is removed from the callstack and the process returns to the offset indicated for the next function, to complete processing of that next function. In this way, the callstack maintains a history of execution of the process, through various functions, as the process is executing. When an error report is generated following a failure, at least a portion of the callstack may be included in the error report.

When an error reporting service receives an error report regarding an error that occurred in a software product, the error report may be assigned to a software developer for review. The developer may diagnose the error by determining a source of the error and may produce a solution to the error, which may include modifying the software product.

When a software product is widely released, and that software product experiences an error, it is likely that many instances of the software product in use by different users and/or different computers may generate the same error. If each of those instances transmits an error report using an error reporting service, then there may be a great deal of redundancy in the error reports received by the error-reporting service. This redundancy may lead to inefficiencies in the processing of error reports and in the diagnosing and correcting of errors identified by the error reports. If two developers at a software vendor both receive an error report that identifies the same error and both begin work on diagnosing and correcting the error, then the work is duplicated.

SUMMARY

It would be advantageous to identify error reports received by an error reporting service that are related to a same error. This would allow for reducing or eliminating duplication of effort when two developers are assigned error reports that are related to the same error and would provide a developer working on an error additional information about the error. Because errors may arise in different circumstances and in different environments, though, it is often the case that two error reports caused by the same error will not be identical. Thus, it is difficult to determine a match between error reports.

Applicants have recognized, however, that while error reports may not be identical, it may be possible to determine a degree of similarity of two error reports by comparing features of the two error reports. Applicants have further appreciated that some features of an error report, or some types of changes or matches between error reports, may be more informative than others when determining whether two error reports were caused by a same error. Thus, by comparing multiple features of an error report and weighting them differently, a more accurate score reflecting the degree of similarity can be obtained than merely by comparing one feature or by weighting features equally. In some embodiments, the weights may be selected such that the score indicates a probability that the compared error reports were generated by the same error in a software product.

In embodiments of the invention described herein, error reports received by an error reporting service are compared to other error reports to identify, based on similarity scores, error reports likely associated with the same error in the software product. Error reports may be compared to other error reports recently received and/or to previously-received error reports to determine similarity. When determining this similarity, different types of changes/matches between error reports are weighted differently in computing the score.

In some cases, when these comparisons are repeated across a set of potentially similar error reports, rather than determining a single match, a ranked set of potential matches could be presented that is ranked based on degree of similarity. In other embodiments, the comparisons are used to form groups of error reports that likely relate to the same error in a software product. These groups can be used to automatically generate rules for classifying future error reports.

In some embodiments of the invention, a score reflecting degree of similarity between two error reports may be determined based on comparing features of the error reports, like failure type, exception code, process name, and callstack, among others. Each of these comparisons may result in a numeric value (which could be a binary value like 0 or 1) that could be used to calculate the degree of similarity. When calculating the score, a result of each of the comparisons (e.g., comparison of failure type, exception code, process name, callstack, etc.) may be weighted differently. If the score is above a threshold value, then the error reports may be identified as similar and/or as caused by the same error.

The comparison of callstacks may be done in any suitable manner. In some implementations, the comparison may be performed by determining an edit distance between the callstacks, which may be a count of a number of changes between the callstacks. These changes could be changes of frames between the callstacks, changes of groups of frames between the callstacks, or other changes between the callstacks. In some cases, determining an edit distance comprises identifying a total number of changes between the callstacks; this total number of changes is the edit distance in these techniques. In other cases, rather than counting only a total number of changes, a count is maintained of different types of changes and is used to determine the edit distance. For example, counts of insertions, deletions, or substitutions of frames between callstacks could be maintained. As a further example, counts of different types of insertions, different types of deletions, different types of substitutions, etc. is maintained. These counts could then be summed in any suitable manner to determine the edit distance. For example, each type of change may be weighted differently and weighted counts could be summed to determine the edit distance.

In some embodiments of the invention, machine-learning techniques may be implemented to improve similarity detection over time, such as by adjusting weights used for each of the feature comparisons (e.g., the weight for the comparison of failure type, the weights for the types of changes used to determine the edit distance, etc.) when calculating the score.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3 is a flowchart of an exemplary process for comparing information contained in two error reports to determine whether the error reports are similar;

FIGS. 4A-4G show exemplary callstacks illustrating types of changes that may be detected and counted by embodiments of the invention when determining a distance between callstacks;

DETAILED DESCRIPTION

Figure 1:
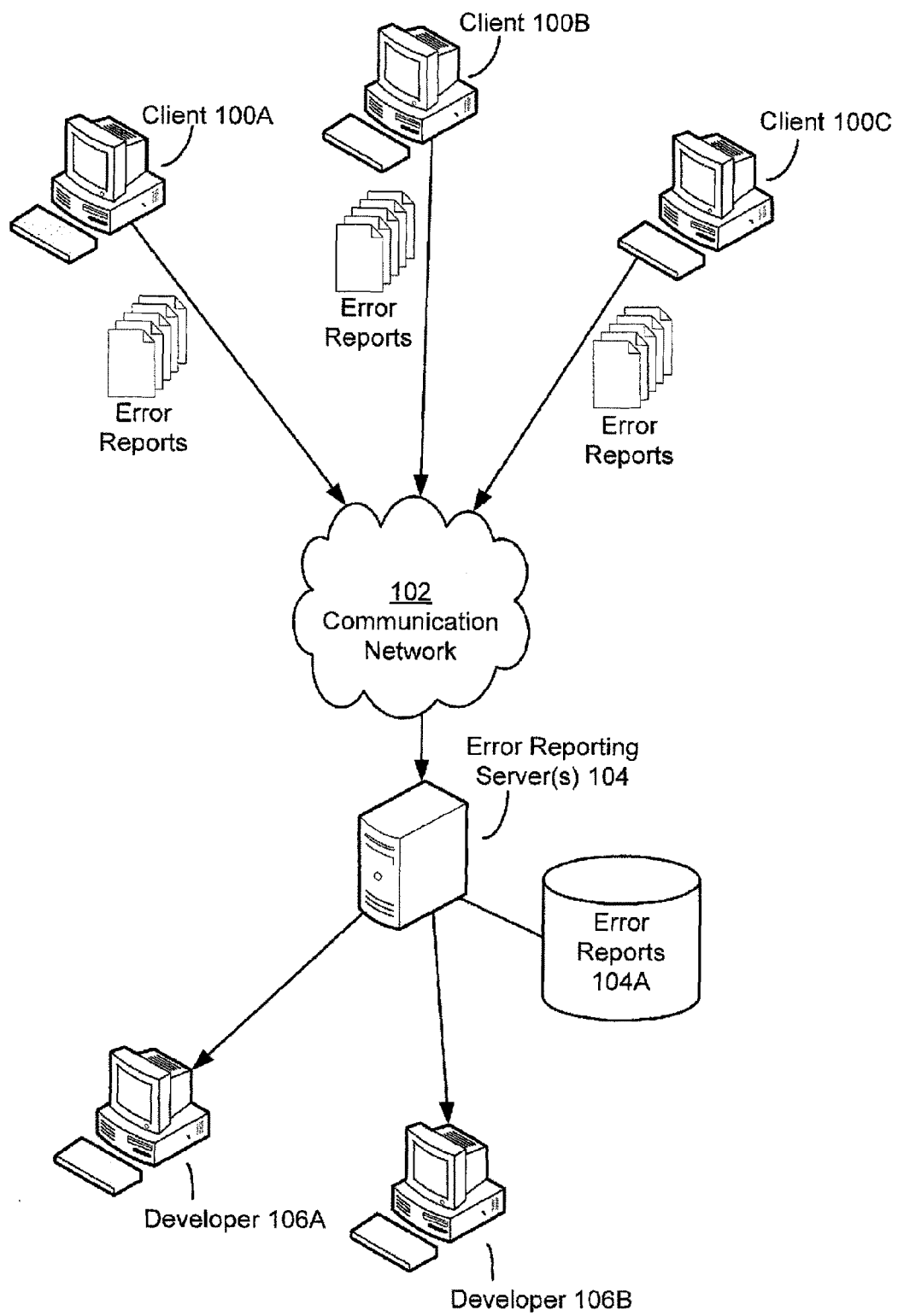
FIG. 1 illustrates an exemplary computer system in which embodiments of the invention may operate.

Applicants have appreciated the desirability of automated techniques for more accurately identifying whether two error reports are similar If a high degree of similarity could be identified for two error reports, it could also be determined that the error reports may be caused by the same error and could thus be assigned to a same developer for review. This could reduce inefficiency and waste in reviewing error reports.

Applicants have further appreciated that identifying similarity between two error reports may be useful in the diagnosis of errors and the solution of errors. If a same error is giving rise to error reports in different circumstances or environments, and a developer is able to review a greater number of error reports in the different environments, then the developer may be able to more quickly identify the error by searching for a constant between the error reports. Further, when the developer is producing a solution for the error, multiple different error reports may permit the developer to produce a more comprehensive solution that solves the problem in different circumstances or different environments, rather than a solution targeted at only one circumstance or environment. Identical error reports would only give the developer the same information each time, but similar error reports, if they could be detected, could provide greater information to a developer that might lead to a faster or more comprehensive resolution of error reports.

Applicants have recognized and appreciated that similar error reports may be more accurately detected by computing a score, representing a degree of similarity between error reports, based on a combination of features. These features may include an edit distance between callstacks contained in the error reports as well as comparisons between categorical attributes of the errors represented by the reports. Applicants have further appreciated that by weighting features of an error report differently, a more accurate detection of similarity can be achieved. Moreover, Applicants have recognized and appreciated that improvements in scoring similarity of error reports may be made using an improved definition of edit distance when comparing callstacks in the error reports.

Described herein are various principles and techniques for an improved method to determine a similarity between error reports. In some embodiments of the invention, error reports received by an error reporting service are compared to other error reports to determine whether any similarity exists. Error reports may be compared to other reports recently received and/or previously-received error reports to determine similarity.

Determining similarity between error reports may be carried out by comparing features of error reports. These features may include categorical attributes of an error report, such as failure types, exception codes, process names, and/or sets of data contained in an error report, such as callstacks. In these techniques, one or more of these features are compared, and the comparison yields a value that may be used to indicate similarity. This value could be a numeric value. Such a numeric value could be a binary value (e.g., 0 or 1) that may indicate whether the features match or not or may be any other suitable value like a score indicating a closeness of the two features. Each of these values may then be used to calculate a degree of similarity between two error reports. When calculating the degree of similarity, the values yielded by the comparisons can be weighted according to how informative those features are to similarity/dissimilarity of two error reports. The weights may be different for each of the features, such that one or more features may be considered more strongly when determining similarity. The degree of similarity, calculated in this way, may be used as a probability that two error reports are similar. Error reports with a degree of similarity above a threshold may then be presented as potentially similar error reports.

These comparisons may be carried out in any suitable manner. For some features the comparison may be a binary comparison of whether a particular feature in one error report is identical to the particular feature in another error report. This may be the case for some features like failure type, exception code, and process name. For other features, though, a comparison may be carried out that determines a score for similarity. For example, callstacks of two error reports may be compared in a way that determines a score identifying a degree of similarity. This numeric score may be calculated as an edit distance between the callstacks.

An edit distance is calculated as a number of changes between the frames or groups of frames between two callstacks. In some embodiments of the invention, this may be done using conventional techniques, and an edit distance may be calculated that weights all types of changes in frames in the same manner In other embodiments of the invention, however, different types of changes may be weighted differently. For example, counts of insertions, deletions, or substitutions of frames between callstacks could be made. As a further example, counts of different types of insertions, different types of deletions, different types of substitutions, etc. are made. These counts could then be summed in any suitable manner to determine the edit distance. For example, each type of change may be weighted differently and weighted counts could be summed to determine the edit distance.

Accordingly, in various techniques described herein, one or more of failure type, exception code, process name, and callstacks, or other features of an error report, may be compared and each individually weighted in a different manner to determine a degree of similarity between the error reports. The weights used in determining a score reflecting the degree of similarity may be set or maintained in any suitable manner. In some embodiments of the invention, machine learning techniques may be implemented to improve similarity detection over time, such as by adjusting the weight used for each of the feature comparisons (e.g., the weight for the comparison of failure type or the weight for each type of changes used to determine the edit distance, etc.). The machine learning techniques may be applied to any suitable data to determine the weights. For example, developers that are reviewing error reports, diagnosing errors, and providing solutions may mark error reports as similar and/or dissimilar while reviewing them. This marked set of error reports may provide a labeled training set that may be used in supervised or semi-supervised learning algorithms to adjust weights.

Techniques described herein maybe implemented in connection with techniques described in the paper "Finding Similar Failures Using Callstack Similarity," by Kevin Bartz et al., presented at the 8th USENIX Symposium on Operating Systems Design and Implementation, Dec. 8-10, 2008. This paper is incorporated herein by reference in its entirety and at least for its discussion of techniques for identifying similar error reports.

Embodiments of the invention may operate with any suitable error reporting service to analyze error reports concerning any suitable software product. Such error reporting services may be structured in any suitable manner and operate in any suitable manner, as embodiments of the invention are not limited to any particular type(s) of error reporting services.

FIG. 1 shows an exemplary computer system that implements one type of error reporting service and in which some embodiments of the invention may operate. In this system, clients 100A, 100B, and 100C are three separate devices with different users and different hardware/software configurations, but that are all executing client software for a particular error reporting service and are all executing a particular software product. The client software for the error reporting service may be tied to the software product or may be separate from the software product. For example, the error reporting service may be specific to the software product and may report only failures of the software product, or the error reporting service may be generic and may report failures for multiple software products.

When the software product fails on any of the three clients as a result of an error in the product, the error reporting client software on the client may detect the failure and prompt a user of that client to report the error to an error reporting service. If the user elects to report the error, an error report is generated and transmitted over a wired and/or wireless communication network 102 to one or more error reporting servers 104. The reports may be stored in a data store 104A of error reports.

Once the error reports are received at server 104, they should be reviewed and analyzed by developers, like developers 106A and 106B, to diagnose the errors such that a correction to the error can be developed and released. Though, for reasons given above, it is advantageous to identify similar error reports. Accordingly, upon receipt or at some later time, a similarity detection facility acts to compare error reports to determine whether any error reports are similar.

The comparison of error reports may be done between any suitable error reports, such as by comparing newly-received error reports to previously-received error reports. Such previously-received error reports may be those error reports that have already been reviewed by developers, including those for which a solution has been produced, and/or may be error reports that have not yet been reviewed by developers. Additionally, in some cases the similarity detection facility may compare newly-received reports to other newly-received reports to determine similarity. Further, as embodiments of the invention are not limited to analyzing error reports upon receipt, in some cases the comparison may be done between any error reports stored in the data store 104A.

Examples of similarity detection processes that may be implemented by the similarity detection facility in various embodiments of the invention are discussed below. Though, it should be appreciated that each of these techniques are merely illustrative, and that embodiments of the invention may operate in any suitable manner to determine a similarity between error reports.

Figure 2:
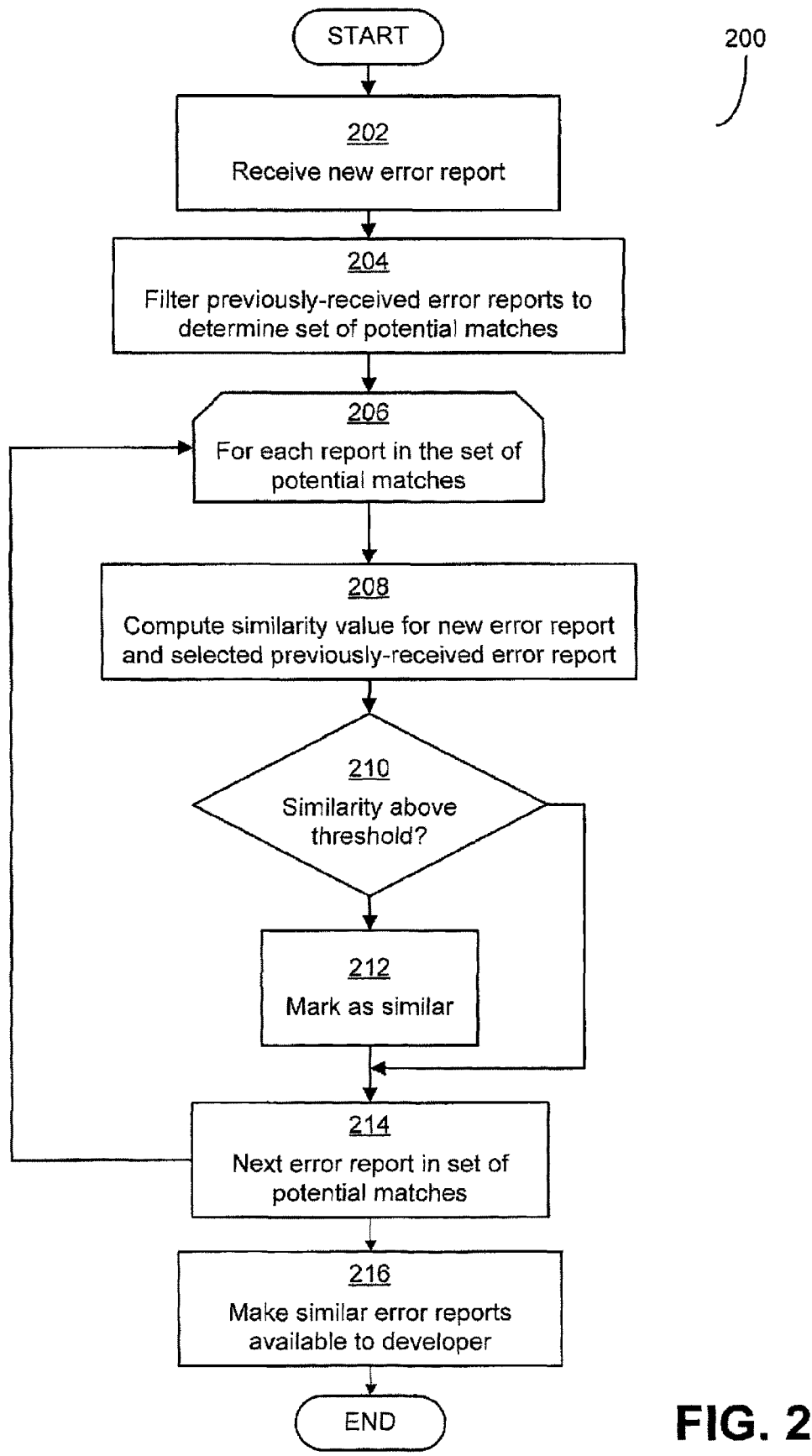
FIG. 2 is a flowchart of an exemplary process for managing error reports that may be implemented in some embodiments of the invention by an error-reporting service.

FIG. 2 shows an example of one such process 200 for computing a score reflecting similarity between a newly-received error report and a set of one or more previously-received error reports. The process 200 begins in block 202, in which a new error report is received.

The new error report may, in some embodiments of the invention, be compared to all previously-received error reports or all error reports received during an interval of time to determine whether any similarity exists. However, in some environments, computing a score for all available error reports may not be possible because of restrictions on resources like processing or time. Accordingly, in such environments a filter may be applied in block 204 to determine a set of previously-received error reports that are potential matches. This filter may be applied in any suitable manner based on any suitable feature of an error report. In some cases, this feature may be applied based on categorical attributes for an error report, such as based on a process name, such that only error reports with the same process name as the newly-received error report are included in the set of potential matches. In other cases, the feature may be the callstack or a portion of the callstack. One exemplary process for applying a filter in block 204 using callstacks is described below in connection with FIG. 6.

Once a set of potential matches is determined in block 204 as a result of the filtering, a comparison may be done between the newly-received error report and each of the error reports in the set of potential matches to determine whether the newly-received error report is similar enough to any previously-received error report that the newly-received error report should be processed with the previously-received error report. Starting in block 206, a particular error report in the set of potential matches is selected and, in block 208, a similarity value for the new error report and the selected previously-received error report is computed. The similarity may be computed by comparing one or more features of the error reports such that each comparison yields a numeric value. These numeric values may then be weighted in any suitable way, summed, and used to produce an overall value or score of similarity. Examples of processes for calculating a similarity score are described in greater detail below. In some implementations, the similarity score is a value between 0 and 1 that indicates a degree of similarity and may indicate a probability that two error reports were generated in response to a same error in the software product.

In block 210, once a similarity value is computed in block 208 it is determined whether that similarity value is above a threshold. If so, then in block 212 the error reports are marked as similar and a next error report in the set of potential matches is selected in block 214. If not, then a next error report in the set of potential matches is selected in block 214. Processing then continues for the next error report by computing a similarity score for the new error report and the next error report in block 208.

Any suitable threshold may be used to determine similarity. The threshold may, in some environments, be used to make a greater or fewer number of similar error reports available to a developer. For example, if the threshold were 0.80, it is likely that more error reports would be marked as similar than if the threshold were 0.95. On the other hand, the inclusion of more (and less similar) error reports means the likelihood increases that a report will be marked as similar despite being caused by a different error. It may be useful in some cases to have additional information, though, despite this increased risk of getting faulty information. Accordingly, the threshold may be set according to the requirements of the developers and the environment. In another embodiment, though, the threshold can be set to any suitable level (e.g., 0) that will produce a complete, unfiltered list based on the similarity between the error report and all potential matches.

Once all error reports in the set of potential matches have been compared to the new error report and all reports with similarity values above the threshold have been marked as similar, information on the similarity of the new error report to previously received error reports may be applied in any suitable way. The information may be used, for example, to form groups of similar error reports or to determine whether a new error report is similar to a previously received error report. In the embodiment illustrated, in block 216 when a new error report is similar to an error report already assigned to a developer to investigate, the new error report is assigned to the same developer. In block 216, all the error reports may be assigned to the developer or may be presented to the developer in response to a request for similar error reports.

Once the similar error reports are made available, then the process 200 may end. In some embodiments, though, the process 200 may be continually executing for each new error report, such that all error reports may be compared and similar error reports identified. In such embodiments, the process 200 would not end, but rather would continue back to block 202 for comparison of another new error report.

Computing the similarity between the two error reports, as carried out in block 208 of FIG. 2, may be done in any suitable manner. As discussed above, the comparison of two error reports may be based on comparing features of those error reports, such as one or more of failure type, exception code, process name, and callstack, among others. As also discussed above, some of these features may be more informative (i.e., be a stronger identifier of similarity or dissimilarity) than others when determining whether two error reports are similar. Accordingly, the comparisons of different features may be given different weights when determining whether two error reports are similar, such that more emphasis may be placed on more informative features and less emphasis may be placed on less informative features.

In some embodiments of the invention, weights used in computing a similarity value for two error reports can be calculated using a statistical machine learning approach. Though, in other embodiments, other types of analyses can be used such as neural networks, support vector machines, decision trees, and other types of analyses known or to be known by one skilled in the art. In embodiments that use statistical machine learning, weights may be calculated using an inverse logit function that is used in logistic regression analyses, shown in Equation (1).

$$g^{-1}(x) = \frac{e^x}{1+e^x} \qquad (1)$$

This equation can be applied to the similarity detection problem in the manner shown in Equation (2).

$$P(Sim|\beta,X) = g^{-1}(\alpha + \beta_{FT}\{FT_1 = FT_2\} + \beta_{PN}\{PN_1 = PN_2\} + \beta_{EC}\{EC_1 = EC_2\} + \beta_{CS}\text{EditDistance}(CS_1, CS_2)) \qquad (2)$$

Each of the $\beta$ parameters in Equation (2) are the weights assigned to the terms of the calculation, each corresponding to a particular comparison operation performed on a feature of the error reports. Each of these weights may be different, such that different features of the error reports are considered differently when calculating the similarity value. The value $\alpha$ may be set as any suitable constant.

The $\alpha$ term may be included as a "bias term" or "intercept" in a logistic regression model. In a logistic regression model, the bias term represents the distance from the decision hyperplane to the origin. $\alpha$ may take any suitable value, including 0. If $\alpha$ is 0, the decision hyperplane passes through the origin.

Values of the weights in Equation (2), such as $\alpha$, $\beta_{FT}$, $\beta_{PN}$, $\beta_{EC}$, and $\beta_{CS}$, can be computed such that some cost function is maximized when Equation (2) is used to correctly predict similarity of error reports in a training set. The training set may contain error reports that have been reviewed by a human such that similar, and dissimilar, error reports are tagged. The cost function, when optimized, may predict a maximum likelihood that similar error reports in the training set are classified as similar, though other cost functions may be employed.

Though not expressly shown in Equation (2), the function EditDistance($CS_1$, $CS_2$) may itself contain multiple weights, each weighting a count of type of difference between a first callstack ($CS_1$) and a second callstack ($CS_2$). These weighting values may also be computed using logistic regression over a training set of previously classified error reports.

Table I lists possible parameter values that may be computed in this way:

TABLE I

| Parameter | Weights |
|---|---|
| $\alpha$ | 3.45 |
| $B_{ET}$ | 1.36 |
| $B_{PN}$ | 1.18 |
| $B_{EC}$ | 2.14 |
| $B_{CS}$ | −6.99 |
| $\gamma$InsSame | 0.72 |
| $\gamma$InsNew | 1.48 |
| $\gamma$DelSame | 0.56 |
| $\gamma$DelLast | 1.54 |
| $\gamma$SubMod | 2.44 |
| $\gamma$SubFunc | 0.25 |
| $\gamma$SubOffset | 0.00 |
| LL | −149.6 |

The values for $\gamma$ in Table I may be used for computing edit distance, as described below in Equation (3).

Though Equation (2) shows four features of error reports that are compared—failure type (FT), process name (PN), exception code (EC), and callstacks (CS)—it should be appreciated that any one or more of these may be sufficient to determine similarity between error reports and that other features of error reports may be compared.

Figure 3:
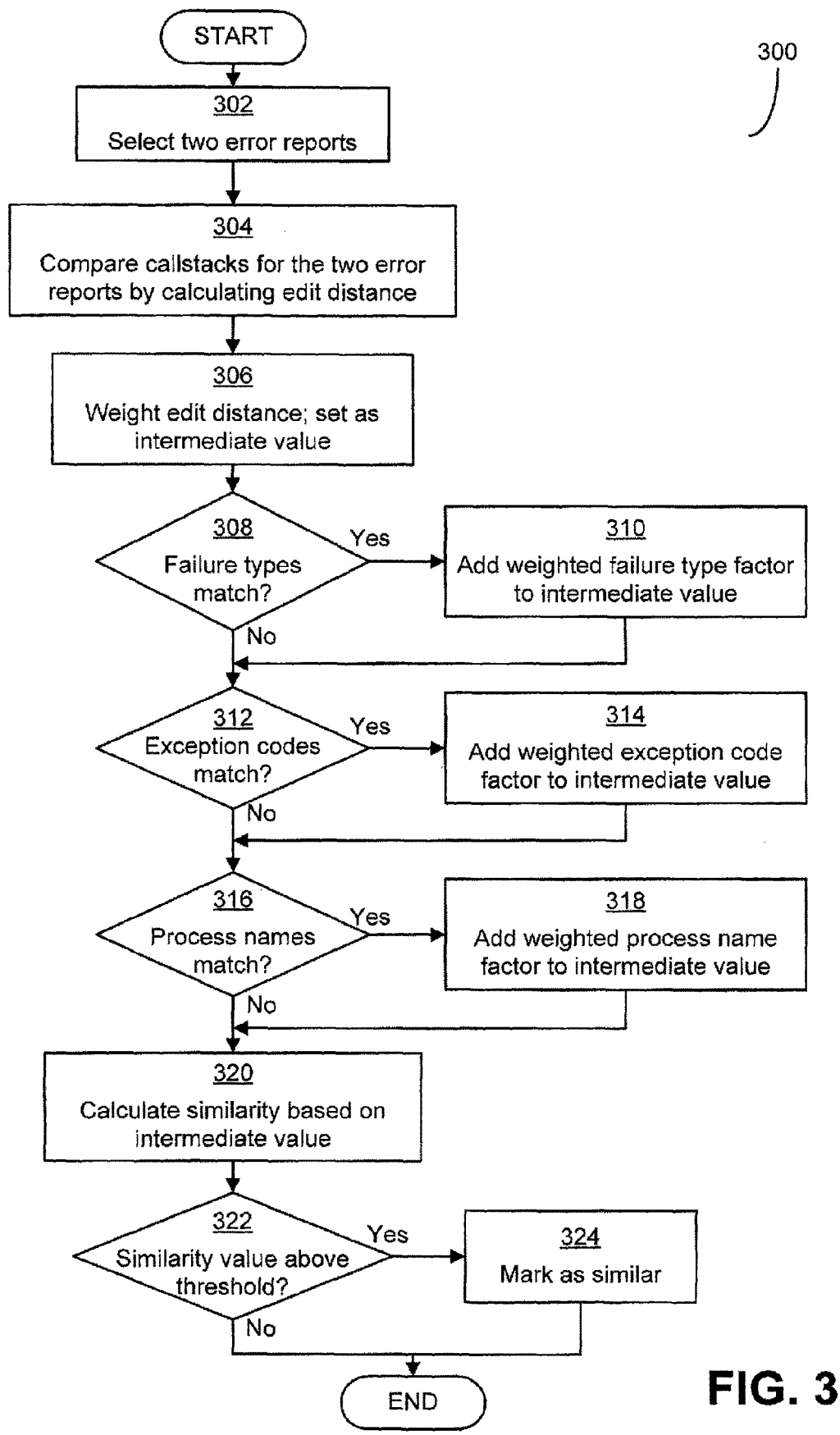

Regardless of how weights are computed, FIG. 3 shows one manner of using those weights in computing a similarity value for two error reports. The process 300 of FIG. 3 begins in block 302, in which two error reports are selected for comparison to determine whether the error reports may have been generated as a result of a same error. An intermediate value that will be used in calculating the similarity value is initialized to 0.

In block 304, the comparison of the two error reports begins with a comparison of the two callstacks of the error reports. The callstacks of the two error reports are compared in the example of FIG. 3 by calculating an edit distance between them (in Equation (2), "EditDistance($CS_1$,$CS_2$)"). The edit distance may be calculated in any suitable manner, including according to conventional techniques or techniques described below, by considering each frame of the callstacks to be a single unit. The edit distance, which is typically a count of the number of changed units between two sets of units, would therefore be a count of the number of changed frames between the two callstacks. Procedures for calculating edit distance are known (e.g., procedures for calculating the Levenshtein distance) and as such conventional techniques will not be discussed in detail herein. Though an improved technique for calculating an edit distance is discussed below in connection with FIG. 5 and may use the weights described in Table I above.

Once an edit distance is calculated in block 304, in block 306 the numeric result of the edit distance (e.g., a count of the number of changes, that may be normalized to a value between 0 and 1 or not) is weighted according to $\beta_{CS}$ to determine a weighted value for the edit distance. An intermediate value is set equal to this weighted edit distance. Other terms are then computed and added to this intermediate value to compute the total similarity score.

In block 308, the failure types for the two error reports are compared to determine a comparison result indicating whether the failure types are identical (in Equation (2), "$FT_1=FT_2$"). This comparison produces a binary output, 0 for a difference or 1 for a match. If the failure types are determined to match, then in block 310 the 1 (indicating a match) is weighted according to $\beta_{FT}$ to determine a weighted value for the failure type factor. The weighted failure type factor is then added to the intermediate value. If the failure types do not match, or following the weighting/adding of block 310, processing proceeds to block 312.

In block 312, the exception codes for the two error reports are compared to determine a comparison result indicating whether the exception codes are identical (in Equation (2), "$EC_1=EC_2$"). This comparison produces a binary output, 0 for a difference or 1 for a match. If the exception codes are determined to match, then in block 314 the 1 (indicating a match) is weighted according to $\beta_{EC}$ to determine a weighted value for the exception code factor. The weighted exception code factor is then added to the intermediate value. If the exception codes do not match, or following the weighting/adding of block 314, processing proceeds to block 316.

In block 316, the process names for the two error reports are compared to determine a comparison result indicating whether the process names are identical (in Equation (2), "$PN_1=PN_2$"). This comparison produces a binary output, 0 for a difference or 1 for a match. If the process names are determined to match, then in block 318 the 1 (indicating a match) is weighted according to $\beta_{PN}$ to determine a weighted value for the process name factor. The weighted process name factor is then added to the intermediate value. If the process names do not match, or following the weighting/adding of block 318, processing proceeds to block 320.

It should be appreciated that, though the actions of blocks 310, 312, and 316 are described as determining whether categorical attributes are identical, as discussed above some embodiments are not limited to determining an absolute match. In some embodiments, a match may be found where only slight or insubstantial differences exist. Additionally, in other embodiments, any other suitable comparison may be made other than to determine whether the attributes match; for example, the categorical attributes may be compared to determine a degree of similarity or difference.

In block 320, the intermediate value is used to calculate the similarity value. Following the process of blocks 316 or 318, the intermediate value represents the sum of the last four terms of Equation 2. Accordingly, the intermediate value (IV) may be summed with the constant $\alpha$, and provided as input ($x=\alpha+IV$) to the inverse logit function of Equation 1. The output of Equation 1 is then taken as the similarity value for the two error reports.

In block 322, the similarity value output by Equation (1) in block 320 is compared to a threshold value, as in block 210 of FIG. 2. If the similarity value is above the threshold, then in block 324 the two error reports are marked as similar and the process 300 ends for the two selected error reports. If the similarity value is not above the threshold, then the process 300 ends for the selected error reports. The process of FIG. 3 may be repeated for any suitable number of error reports. In some embodiments, the process will be repeated across a historical database of error reports to create groups of error reports deemed similar. Further processing may then be performed on these error reports.

In some embodiments, the groups of similar error reports may be used as inputs to machine learning tools that, using known techniques, develop classification rules that can be used for sorting new error reports.

Alternatively, the sorted groups can be examined to determine which groups relate to previously known error conditions or, conversely, which relate to previously unknown error conditions. In this way, errors in a software product may be diagnosed.

Classified groups of error reports may additionally or alternatively be used to diagnose conditions in a computer environment that may lead to software failures. For example, groups of error reports may be used to identify hardware errors or viruses and/or other forms of malware that cause error reports to be generated.

In embodiments of the invention that may use error reports to diagnose one or more forms of malware, the malware can be identified in any suitable manner. In one implementation, malware may be detected through the use of hashes. If hashes of one or more files associated with processes in a callstack are returned in an error report, and at least one of those hashes matches a hash of a known malware file, then other error reports which contain identical hashes may be inferred to have been generated by that malware file.

The use of hashes may not be possible in all cases, though. Often, a malware file is polymorphic or metamorphic and is automatically modified in sophisticated ways to avoid detection from anti-virus and anti-malware engines. These modifications may result in a different hash for a modified file, preventing diagnosis using hashes alone. Though, hashes may be used in some embodiments as part of a malware diagnosis process. In such embodiments, if an error report contains a hash of a known instance of polymorphic and metamorphic malware, other components of the error report (e.g., callstacks, categorical features, etc.) may be used to identify a similarity to one or more other error reports in any suitable manner, including by conventional similarity detection techniques or techniques described elsewhere herein. Similar error reports then may be diagnosed as being produced by the known malware file and/or may be flagged for review by another system (e.g., a dedicated malware detection system), human operator review, or review in any other manner.

In other embodiments, hashes may not be used as part of a malware diagnosis process. Computing file hashes can take a relatively large amount of processing and time and expending resources computing the hashes may not be desirable in all environments. In such environments, then, file hashes are often not included in error reports.

In an alternative malware diagnosis process, malware may be identified based on process or module names including in error reports. Some developers of malware may try to hide their malware as legitimate software, such as operating system files, to prevent detection and removal. One method malware developers use is assigning software names (e.g., process names, file names, etc.) to malware files that are similar to those of legitimate files. For example, a piece of malware may be named "iexplore1.exe," similar to the legitimate Internet Explorer file "iexplore.exe" in the Microsoft Windows operating system.

When error reports are examined, software names included in the error reports may be compared to software names for legitimate software to calculate an edit distance between them. This edit distance may be calculated in any suitable manner, including by conventional techniques or by techniques described elsewhere herein. Upon calculating the edit distance, software names having a small edit distance (e.g., an edit distance below some configurable threshold) may be identified as suspicious. If a suspicious error report is identified, similar error reports can be identified using any suitable similarity detection technique, including by conventional techniques or techniques described elsewhere herein.

If, based on the similarity detection results, multiple error reports exhibiting very similar crash or hang results but possessing significantly different filenames are found, a polymorphic instance of malware may have been identified. Each of these error reports may be diagnosed as being produced by the malware and/or may be flagged for review by another system (e.g., a dedicated malware detection system), human operator review, or review in any other manner.

Though specific components of an error report have been described above as being used in a malware detection process, any suitable component of an error report may additionally or alternatively be used to identify malware. If an error report includes file dates for files associated with a process, suspicious file dates (e.g., incorrectly formatted dates, dates in the future, dates far in the past, or other suspicious dates) may be identified and the error reports containing them flagged. If an error report includes digital signatures for files associated with a process, unsigned files, files signed by an untrusted authority, or files that have inaccurate or falsified signatures may be used to flag error reports as suspicious. Flagged error reports can then compared to other error reports in a similarity detection process, using either conventional techniques or techniques described elsewhere herein, to identify other error reports that may have been caused by a same malware file. Each of the similar error reports may be diagnosed as being produced by the malware and/or may be flagged for review by another system (e.g., a dedicated malware detection system), human operator review, or review in any other manner.

It should be appreciated that while some embodiments may use error reports in a malware detection process, other embodiments will not perform a malware detection process or may perform a malware detection process using resources other than error reports. Further, it should be appreciated that the exemplary malware detection processes described above are merely illustrative of the types of detection processes that may be implemented to detect malware based on components of an error report and that others are possible.

It should be appreciated that the terms in Table 1 and the process 300 of FIG. 3 are merely illustrative of the various ways in which a similarity value for two error reports may be computed, and that others are possible. Embodiments of the invention are not limited to implementing the process 300 of FIG. 3 nor to applying either of the Equations (1) or (2) or the specific values in Table 1.

For example, while FIG. 3 shows four features used in comparing error reports, other embodiments of the invention may operate with additional or alternative features when comparing error reports. If different features are used, the weighting of each feature may be different.

As noted above, edit distance may be computed using a known technique. However, greater classification accuracy may be achieved by using an alternative approach for computing edit distance. In such an approach, multiple types of differences between callstacks being compared may be separately counted. These counts for the different types of differences may be weighted and summed to produce a value representing an edit distance.

For example, many conventional techniques for calculating edit distance identify three types of changes between the inputs: insertions, deletions, and substitutions. For strings of letters, an insertion may be the addition of a letter: "cat" becomes "cats" with the insertion of an S. A deletion, in this context, would be the removal of a letter: "cat" becomes "at." Lastly, a substitution would be the change of a letter: "cat" becomes "bat." For each of these examples, the edit distance is 1, as there is one change between the two strings of letters and, in conventional techniques, each type of change is weighted the same (i.e., with a 1).

In some embodiments of the invention, different types of changes to callstacks, like insertions, deletions, and substitutions of frames, among others, may be weighted differently when calculating the edit distance. These weighting factors may be provided as input to an EditDistance function, along with the two callstacks. Equation 3 shows Equation 2 modified to accept these additional parameters.

$$P(Sim|\beta,\gamma,X)=g^{-1}(\alpha+\beta_{FT}\{FT_1=FT_2\}+\beta_{PN}\{PN_1=PN_2\}+\beta_{EC}\{EC_1=EC_2\}+\beta_{CS}\text{EditDistance}(CS_1,CS_2,\gamma)) \quad (3)$$

It should be appreciated that, as discussed above, while some embodiments of the invention may use a logistic regression analysis to determine the parameters (including the γ parameters) of Equation (3), in other embodiments, the parameters in Equation (3) can be learned using other types of analyses such as neural networks, support vector machines, decision trees, and other types of analyses known or to be known by one skilled in the art.

The additional γ parameters (examples of which are shown above in Table I) identify weighting factors for two or more types of changes that may be seen between callstacks. For example, an insertion of an additional frame from one callstack to another, a deletion of a frame, and a substitution of a frame may all be weighted differently.

Further, in some embodiments of the invention different types of insertions, deletions, and/or substitutions may be weighted differently. A training set as described above in connection with Equation (2) may alternatively be applied to Equation (3) to determine all weighting parameters, including the γ parameters.

The γ parameters may supply weights for changes between callstacks that result in changes between frames and for changes to frame groups. As discussed in the Background above, the callstack identifies functions that are being executed on a computer. For each function, a frame of a callstack identifies the function being executed, a memory offset at which execution of the function stopped (e.g., by calling another function), and a module (e.g., file or library) that contains the function. A frame group in a callstack is a contiguous group of frames for functions of the same module. For example, as shown in callstack 400 of FIG. 4A, the top three frames of the callstack 400 are from a common module, kernel32. Thus, these three frames form a frame group.

When two callstacks are being compared, in some embodiments of the invention a change in frames that leads to the addition or removal of frame groups may be weighted more heavily than changes within a frame group.

Some types of changes between callstacks may result in changes within frames, such as changes to individual attributes of a frame. For example, a change may be made to the memory offset of a frame while the module and function names remain the same and a change may be made to the function name of a frame while the module name remains the same. When two callstacks are being compared, in some embodiments of the invention different types of changes within frames may be weighted differently.

FIGS. 4A-4G show examples of some exemplary types of changes between callstacks that may be tracked and weighted differently when calculating an edit distance between callstacks. In each of FIGS. 4A-4G, the same original callstack is given as well as a callstack with one of the exemplary types of changes to which it is being compared. As used herein, the term "change" reflects the way in which the first callstack could be charged to match the second callstack. In the embodiments herein, each change represents one step in a sequential process by which portions of the first callstack could be transformed to match the second callstack. It does not necessarily indicate that the second callstack was derived from the first callstack.

In the example of FIG. 4A, the original callstack 400 has five frame groups: kernel32, A3DHF8Q, kernel32, user32, and ntdll. In the edited callstack 402, a new frame has been inserted into the first kernel32 frame group (shown in bold and italics). This is the first example of a type of change between callstacks: to arrive at the second callstack from the first, a new frame is inserted into an existing frame group.

FIG. 4B shows another example, in which the change between the callstacks could be described as a new frame inserted into callstack 400 to arrive at callstack 404. The inserted frame is again shown in bold and italics. Here, though, the new frame does not correspond to any existing frame group; rather, the additional frame has formed a new frame group foobar. This is another example of a type of change between callstacks: the insertion of a new frame group.

FIG. 4C shows an example of a type of change that could be described as a deletion. To arrive at callstack 406 from callstack 400, one frame is deleted. The deleted frame is the first frame of ntdll frame group of the callstack 400. However, the deletion of the frame does not result in the deletion of the ntdll frame group. This is another example of a type of change between callstacks: the deletion of a frame from a frame group while other frames in the frame group remain.

FIG. 4D, on the other hand, shows the deletion of a last frame of a frame group, which is another type of change between callstacks. The top callstack of FIG. 4D is the callstack 406 of FIG. 4C. To arrive at callstack 408 from callstack 406, the only remaining frame of the ntdll frame group (which is the bottom frame of the callstack) is deleted. When this frame is deleted, then, the frame group is deleted.

FIGS. 4E, 4F, and 4G show examples of types of substitutions. Substitutions of frames may occur when some attributes of a particular frame remain consistent between callstacks but other attributes of the particular frame change.

In the example of FIG. 4E, a substitution occurs when a module of a particular frame changes. To arrive at callstack 410, the module name of the third frame of callstack 400 changes from "kernel32" to "foobar." The module name for this frame changed. In many cases, the function name and/or memory offset may also change when the module name changes, but this is not necessary.

In FIG. 4F, a substitution occurs when a function name of a particular frame changes. To arrive at the edited callstack 412, the function name of the third frame of the original callstack 400 changes from "MultiByteToWideChar" to "foobar." The module name remained the same, but the function name changed. In the example of FIG. 4F, the memory offset also remained the same, though this is not necessary and the memory offset could also change with the function name.

In FIG. 4G, another type of substitution is shown. The substitution of FIG. 4G occurs when the memory offset of the third frame of the original callstack 400 changes from 0x9 to 0x17. The module name and function name remained the same, but the memory offset changed.

It should be appreciated that while various examples of different types of changes have been given—such as insertions, deletions, and substitutions, and different types of insertions, deletions, and substitutions—these are not the exclusive types of changes that may be made between callstacks and that other ways of expressing differences between callstacks are possible.

Further, while the examples of each of FIGS. 4A-4G show one operation of each type, it should be appreciated that these operations may be used together to describe differences between callstacks and to compute an edit distance between callstacks. For example, if the last two frames of the original callstack 400 (in the frame group ntdll) of FIG. 4A were deleted, there would be two types of operations: first, a deletion of a frame that leaves other frames in the frame group, and second, a deletion of a last frame in the frame group. Each of these types of changes may be weighted differently when calculating an edit distance. As discussed above, insertions, deletions, and substitutions could be weighted differently when calculating an edit distance. Additionally, different types of insertions, deletions, and substitutions, including the types discussed above, may be weighted differently.

Figure 5:
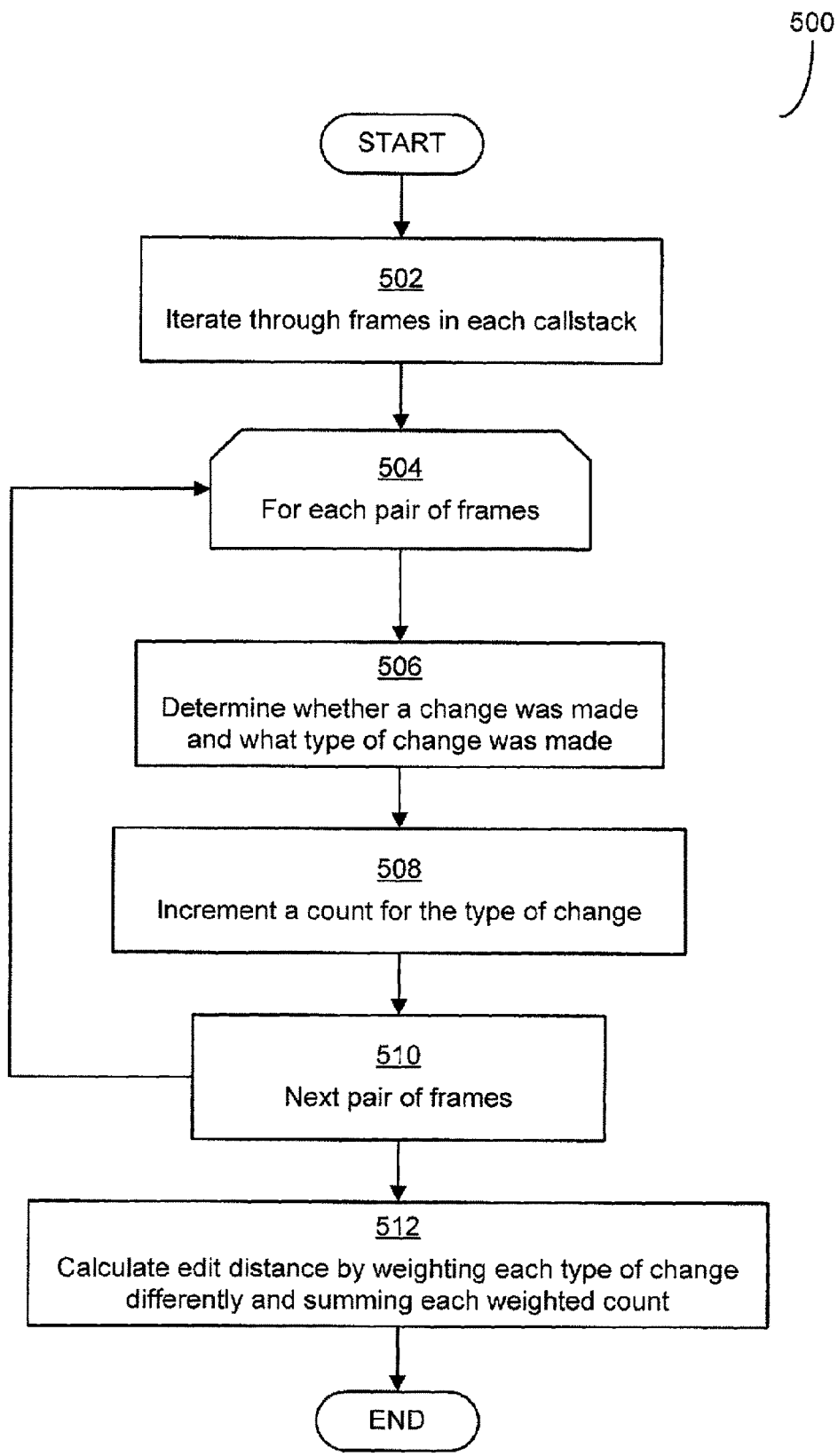
FIG. 5 is a flowchart of another exemplary process for comparing callstacks of two error reports to determine similarity between the error reports.

FIG. 5 shows an exemplary process that may be implemented for calculating an edit distance for two callstacks based on different types of changes between the two callstacks. In many conventional techniques for calculating an edit distance, each callstack would be iterated over successively, such that each frame in a callstack would be compared to all frames in the other callstack and vice versa. Because there are often multiple sets of changes that could be applied as one callstack to transform it to another, the edit distance is usually determined based as the set containing the minimum number of changes. Comparing all of the frames through the iterative process allows for determining a minimum number of changes between call stacks, rather than merely one set of changes. In this way, every pair of frames is analyzed to determine whether there are any changes. In these conventional techniques, analysis stopped at whether there was any change and it was merely noted that there was a change, as these conventional techniques did not weight types of changes differently. In the process 500 of FIG. 5, however, the frames of each callstack are iterated and a determination is made for pairs of frames as to what type of change was made.

The process 500 of FIG. 5 begins in block 502, in which the iteration through frames of each callstack begins. In block 504, processing begins on each pair of frames selected during the iteration. In block 506 a determination is made, based on the pair of frames, as to whether any change was made and, if so, the type of change that was made. The type of changes may be any of those discussed above, or any other suitable type of change. In block 508, a count for the type of change identified in block 506 is incremented. Once the count is incremented in block 508, then a next pair of frames is selected in block 510. In some embodiments, the count for each type of change may be capped at some predetermined value. For example, in some embodiments, the count may be capped at one, creating a binary value for the count of 0 or 1 that identifies whether a type of change is present. In this case, incrementing the count at block 508 may only result in a change in the count value if the cap has not been reached.

After all the frames have been considered, all the changes between the frames identified, and a count of each type of change has been determined, then in block 512 the edit distance is calculating by weighting the counts for each type of change and summing each weighted count. Once the edit distance is calculated in block 512, the process 500 ends.

It should be appreciated that process 500 of FIG. 5 is merely one example of the types of processes that may be implemented in embodiments of the invention for calculating an edit distance based on different weights for each type of change, and that others are possible. Embodiments of the invention that calculate an edit distance using different weights for different changes are not limited to implementing the process illustrated in FIG. 5.

The comparison of two error reports to determine whether they are similar can be performed with any two suitable error reports. In some cases, a first error report will be a newly-received error report, recently received from a client that experienced a failure of a software product, and a second error report may be an error report previously-received and stored in a data store of error reports (e.g., data store 104A of FIG. 1). In other cases, two newly-received error reports may be compared to one another, or two previously-received error reports may be compared to one another. Any suitable pair of error reports may be compared.

In some embodiments of the invention, a comparison of error reports may be carried out only if the error reports have some minimal level of similarity. This minimal level of similarity may be determined during a filtering process, as discussed above in connection with FIG. 2, that acts to identify potential matches to a selected error report to save resources (e.g., time and processing) from being expended on comparisons of dissimilar error reports.

The filter that is used to determine the minimal level of similarity may be any suitable filter. In some embodiments of the invention, this filter may be applied using sets of frames of the callstacks of the error reports. Sets of related frames have been discussed above in connection with frame groups, the contiguous sets of frames in a callstack all related to a same module. Filters may be applied using frame groups, though other sets of frames are also possible. In some implementations, a filter based on sets of frames may match n-grams of frames between two error reports to determine whether they have a minimal level of similarity.

In text, an n-gram may be a string of n letters or a string of n words. When used in callstacks, an n-gram may be a string of n frames. The set of n frames may be within a frame group or may be across frame groups, regardless of the frame group in which those frames belong. For example, using the original callstack 400 of FIG. 4A, a first trigram (n-gram with three elements) may be the first three frames, all in the kernel32 frame group, and a second trigram may be the last two frames of the kernel32 frame group (the second and third frames of the callstack) and the first frame of the A3DHF8Q frame group.

N-grams of any length may be used to identify potential matches of error reports (i.e., those error reports meeting the minimal level of similarity) by detecting whether there is a match of n-grams between the two callstacks. Thus, if an n-gram is identified in the first callstack, and the second callstack has that same n-gram, then the error reports having those callstacks may be flagged as potential matches such that a more comprehensive comparison process, like the comparison process 300 of FIG. 3, may be carried out.

Figure 6:
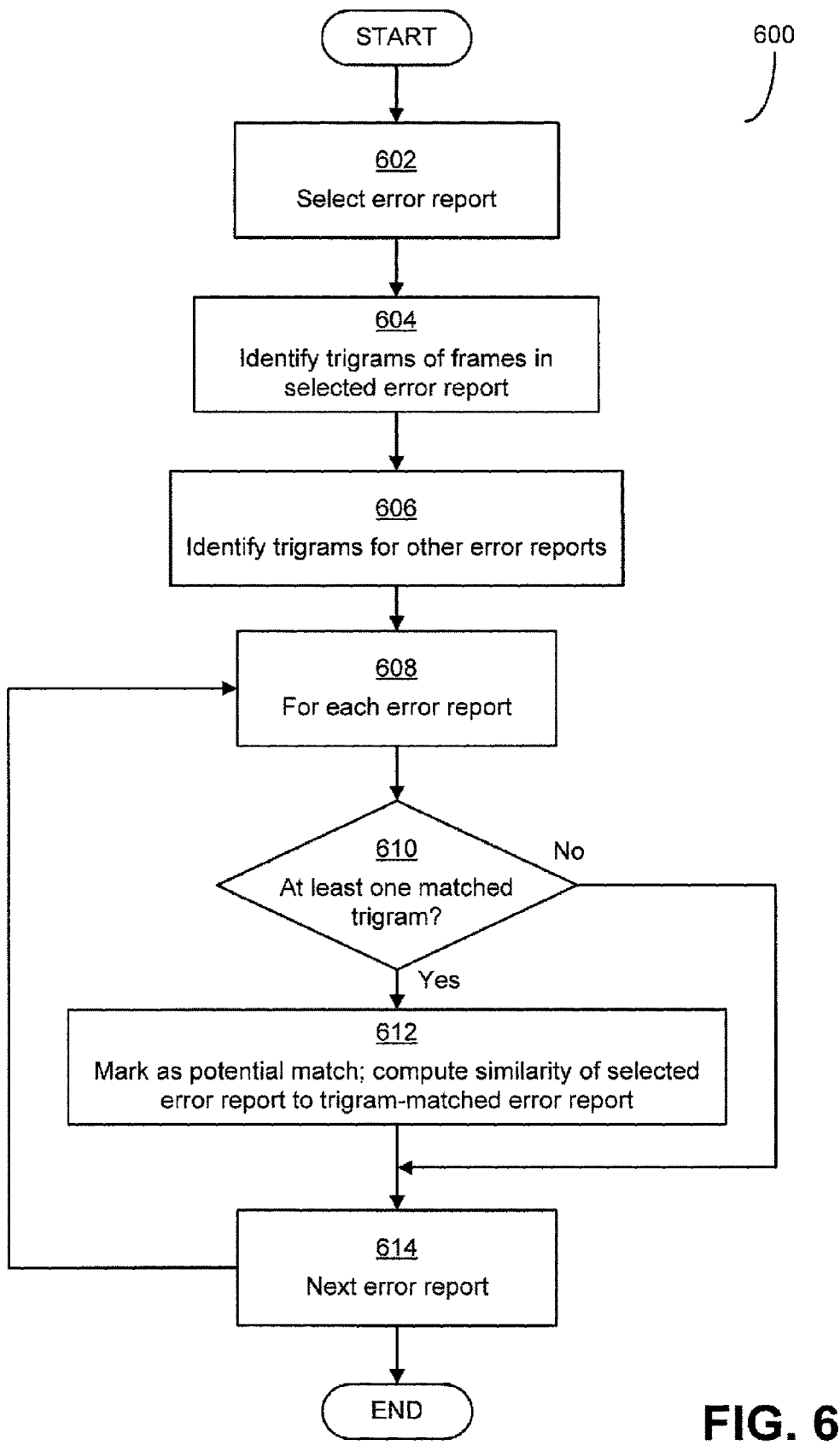
FIG. 6 is a flowchart of an exemplary process for filtering a set of available error reports into a subset of error reports for determining similarity, such that only the subset is compared to a selected error report to determine similarity.

FIG. 6 shows an exemplary process 600 that may be used to filter a set of available error reports to a set of potential matches for a selected error report based on n-grams. The process 600 is described using trigrams (sets of three), but it should be appreciated that n-grams of any size may be used. In the process 600, the available error reports may be all error reports that are eligible to be compared, such as the contents of the data store 104A of error reports of FIG. 1, and the selected error report may be one for which similar error reports are to be identified.

The process 600 begins in block 602, in which a first error report is selected as the selected error report. In block 604, the callstack of the selected error report is analyzed and all possible trigrams of the callstack are identified and, in block 606, the possible trigrams of all available error reports are identified.

Starting in block 608, a comparison is made between the trigrams of the selected error report and the trigrams of each available error report to determine whether there is at least one match. If it is determined in block 610 that there is at least one match between the trigrams of one available error report and the trigrams of the selected error report, then in block 612 that available error report is flagged as a potential match of the selected error report. Processing may be performed on that flagged available error report later to compute a similarity value for that error report and the selected error report, to determine whether they are similar. In block 614, the process 600 loops back to the next available error report and performs another comparison in block 610. Once the trigrams of all available error reports have been compared to the trigrams of the selected error report, the process 600 ends.

Similarity values for error reports, once computed, may be used in any suitable manner. In some cases, they may be used to direct assignment of error reports to developers, such that developers are assigned to review similar error reports. In other cases, a listing of similar error reports may be presented to a developer upon request, such as when the developer is working on a particular error report and requests to view similar error reports.

In some embodiments of the invention, similarity values may be used to label error reports and assign solutions to those error reports. For example, if an error report is identified as being similar to a particular error report, and that particular error report has already been reviewed, diagnosed, and solved by a developer, then the similar error report may be assigned the solution of the particular error report such that the work of the developers may be lessened. By marking error reports as solved in this way, then fewer error reports may have to be reviewed by developers.

Figure 7:
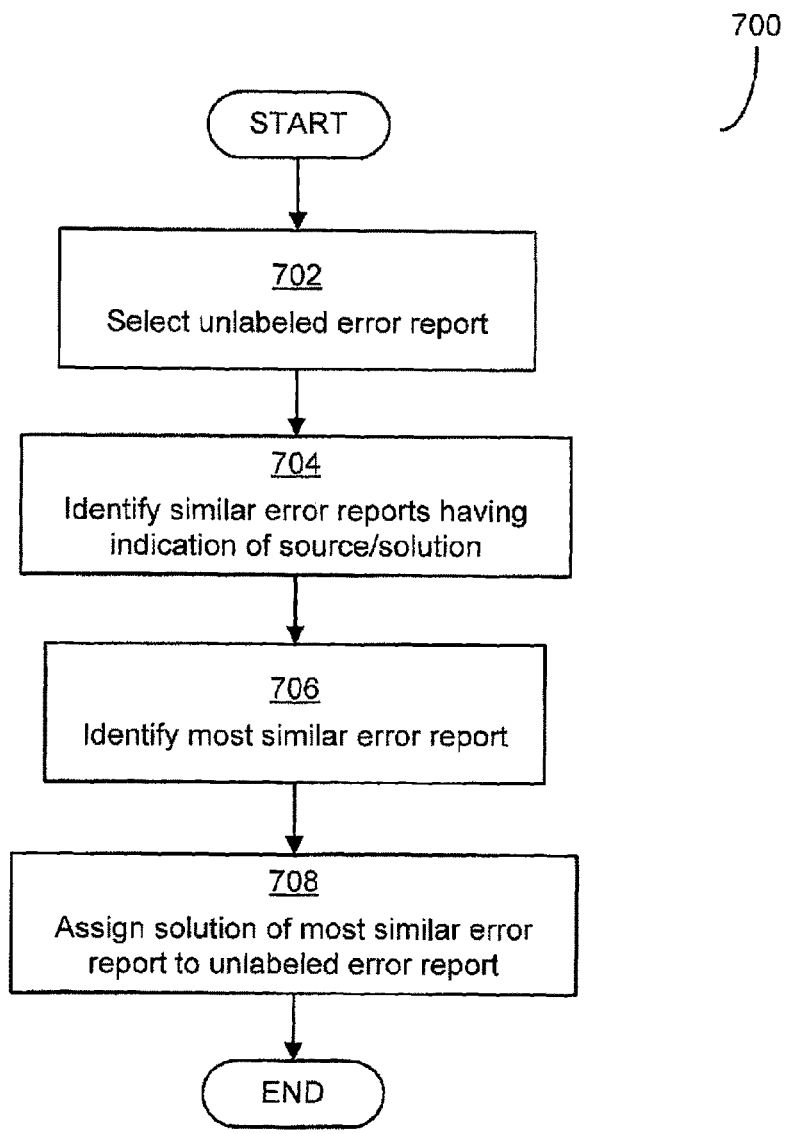
FIG. 7 is a flowchart of an exemplary process for determining a source of an error that resulted in an error report based on similar error reports.

FIG. 7 shows one process 700 for marking error reports with solutions from other, similar error reports, though others are possible. The process 700 begins in block 702, in which an unlabeled error report (i.e., an error report not labeled as reviewed and solved) is selected and, in block 704, similar error reports are identified in any suitable manner. For example, similar error reports may be identified using the process 300 described above in connection with FIG. 3. Similar error reports may be identified in block 704 from a set of labeled error reports, where the labels identify those error reports as having been previously reviewed and solved by developers.

The similarity detection of block 704 may yield a set of one or more error reports that have been marked as similar that may have various similarity values, some higher than others. In block 706, then, the error report with the highest similarity value is selected as the error report that is most likely to have been caused by the same error. In block 708, the solution that is associated with the error report having the highest similarity value is associated with the unlabeled error report selected in block 702. In this way, the unlabeled error report becomes labeled with the solution of the error report having the highest similarity value. Once the unlabeled error report is labeled in block 708, the process 700 ends.

In the process 700, the labels applied by developers while reviewing error reports are used to label other error reports, such as newly-received error reports. These labels may be used in any other suitable way, however. For example, in some embodiments of the invention these labels may be used to train a similarity detection model using supervised or semi-supervised machine learning techniques. The similarity detection model is the set of features and weights that may be used to compute a similarity value for two error reports. Any of the terms of the model (e.g., the weights or the features that are compared) may be adjusted as the result of the machine learning techniques.

In supervised and semi-supervised machine learning, a training set is developed (e.g., by human operators or by a separate automated process) and is analyzed to determine a set of parameters for a model that fits that training set. These training set parameters can then be used to adjust parameters of a model that is applied to other data. In the context of similarity detection of error reports, the labels applied by developers may be used to assemble a training set of error reports that may have been marked by the developers as similar or dissimilar. By analyzing this training set, a set of weights for features of error reports may be developed that appropriately characterizes the error reports that were marked as similar as similar and the error reports that were marked as dissimilar as dissimilar. These weights may be the $\beta$ and/or $\gamma$ weights described above in connection with FIGS. 3 and 5, or any other suitable weights. Then, based on the weights calculated for the training set, the weights of the model that are applied to other error reports may be adjusted in any suitable manner.

The labels applied by the developers may be any suitable labels to indicate similarity or dissimilarity of error reports. For example, when reviewing a new error report, a developer may label that error report as a duplicate of a previously-received error report; in this case, the two error reports may be flagged as similar. When reviewing a different error report, the developer may flag the error as fixed or solved (as above in connection with FIG. 7), a result of a third-party software error (e.g., if the software product failed because of an error in an unrelated piece of operating system software, the error is the fault of the operating system software and not the software product), irreproducible (meaning the developer could not replicate the error), or any other suitable label. These latter labels may be taken, in some embodiments of the invention, as indications that error reports are not similar to other error reports, as the developer did not flag the error reports as similar to any other error reports. Samples may then be taken from the set of training data to produce the weights that can be used to set or adjust weights of the similarity detection model.

Figure 8:
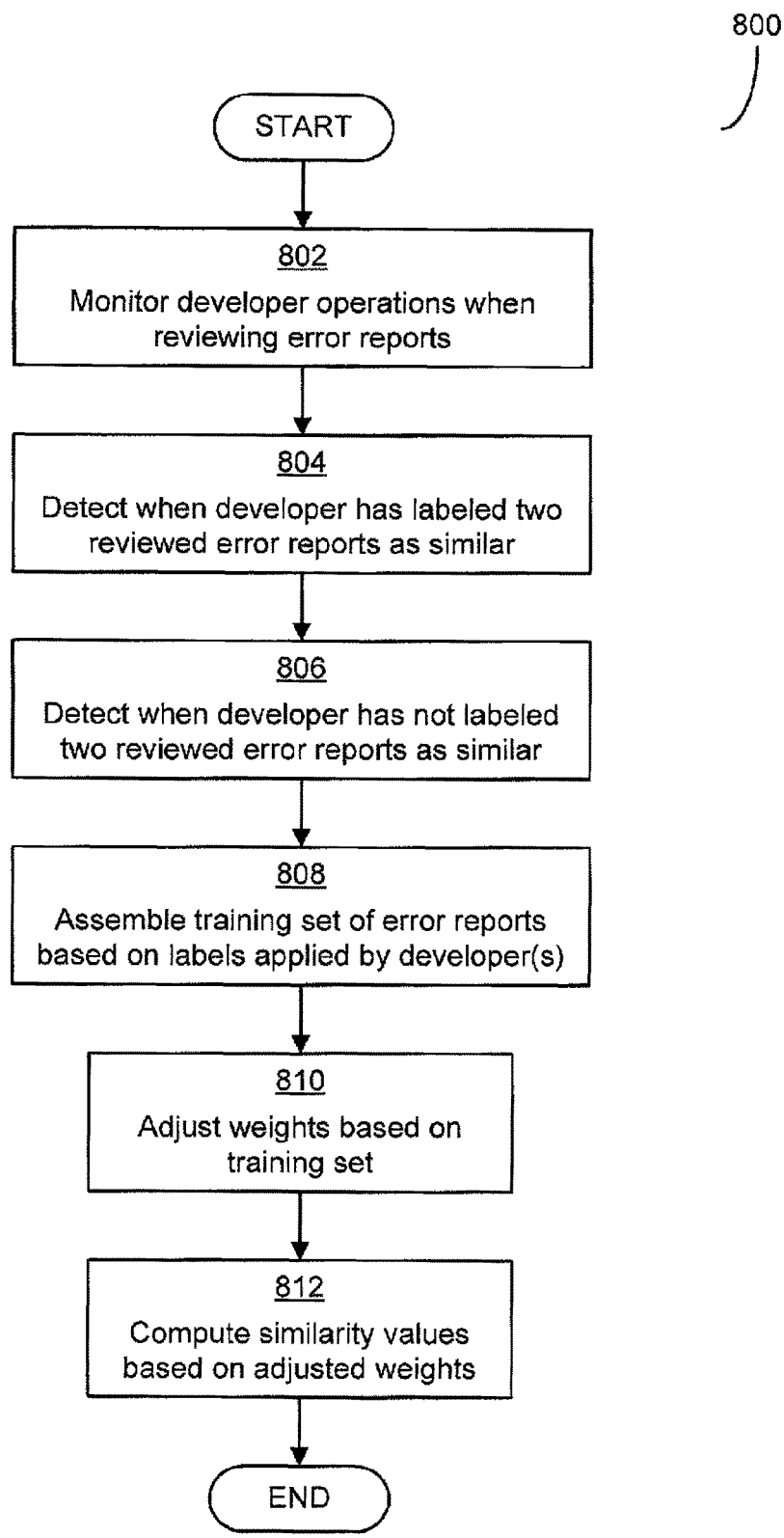
FIG. 8 is a flowchart of an exemplary process for refining techniques for determining similarity based on actions taken by a developer while reviewing error reports.

FIG. 8 illustrates a process 800 that may be carried out for training a similarity detection model based on a training set of labels applied by developers. Process 800 begins in block 802, in which developer operations when reviewing error reports are monitored to detect when a developer has labeled reports. In block 804, it is determined that a developer has labeled two error reports as similar, such as when the developer labels one a duplicate of the other. The duplicate label may be applied to error reports that are caused by a same error, and may not necessarily mean that the two error reports are identical. In block 806, it is detected that a developer has not labeled two error reports as similar, such as when a developer finishes reviewing an error report and either does not label is or does not label the error report with a label that would indicate similarity (e.g., irreproducible).

In block 808, a training set of error reports is assembled based on the labels applied by the developer(s) in blocks 804 and 806. Assembling the training set may comprise selecting all of the error reports labeled in blocks 804 and 806, or may comprise sampling the error reports labeled in block 804 and 806 to select only some of the labeled error reports.

In blocks 810, the weights of the similarity detection model (e.g., the weights $\beta$ and/or $\gamma$ of Equations 2 and 3 above) are adjusted based on the training set. In some embodiments of the invention, adjusting the weights may comprise determining weights for the training set and assigning those weights to the model. In other embodiments of the invention, adjusting the weights may comprise determining weights for the training set and then averaging the determined weights for the training set and the previously-determined weights for the model to determine a new set of weights for the model, or performing any other suitable mathematical operation to adjust the weights of the model based on the determined weights for the training set.

In block 812, once the set of weights for the similarity detection model are adjusted, the model with the adjusted weights may be used to compute similarity values for error reports, and the process 800 ends.

Techniques operating according to the principles described herein may be implemented in any suitable manner. Included in the discussion above are a series of flow charts showing the steps and acts of various processes that enable the identification of error reports that may have been generated as a result of the same error. The processing and decision blocks of the flow charts above represent steps and acts that may be included in algorithms that carry out these various processes. Algorithms derived from these processes may be implemented as software integrated with and directing the operation of one or more multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit, or of any particular programming language or type of programming language. Rather, the flow charts illustrate the functional information one of ordinary skill in the art may use to fabricate circuits or to implement computer software algorithms to perform the processing of a particular apparatus carrying out the types of techniques described herein. It should also be appreciated that, unless otherwise indicated herein, the particular sequence of steps and acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, or any other suitable type of software. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations needed to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package, for example as a software program application such as an error reporting service executing on a client computing device and/or a server computing device. These functional facilities may, in alternative embodiments, be adapted to interact with other, unrelated functional facilities and/or processes, to implement a software program application. In other implementations, the functional facilities may be adapted to interact with other functional facilities in such a way as form an operating system, including the Windows® operating system, available from the Microsoft® Corporation of Redmond, Wash. In other words, in some implementations, the functional facilities may be implemented alternatively as a portion of or outside of an operating system.

Some exemplary functional facilities have been described herein for carrying out one or more tasks. It should be appreciated, though, that the functional facilities and division of tasks described is merely illustrative of the type of functional facilities that may implement the exemplary techniques described herein, and that the invention is not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable storage media to provide functionality to the storage media. These media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable storage medium may be implemented as computer-readable storage media 906 of FIG. 9 described below (i.e., as a portion of a computing device 900) or as a stand-alone, separate storage medium. It should be appreciated that, as used herein, a "computer-readable media," including "computer-readable storage media," refers to tangible storage media having at least one physical property that may be altered in some way during a process of recording data thereon. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1. Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 9:
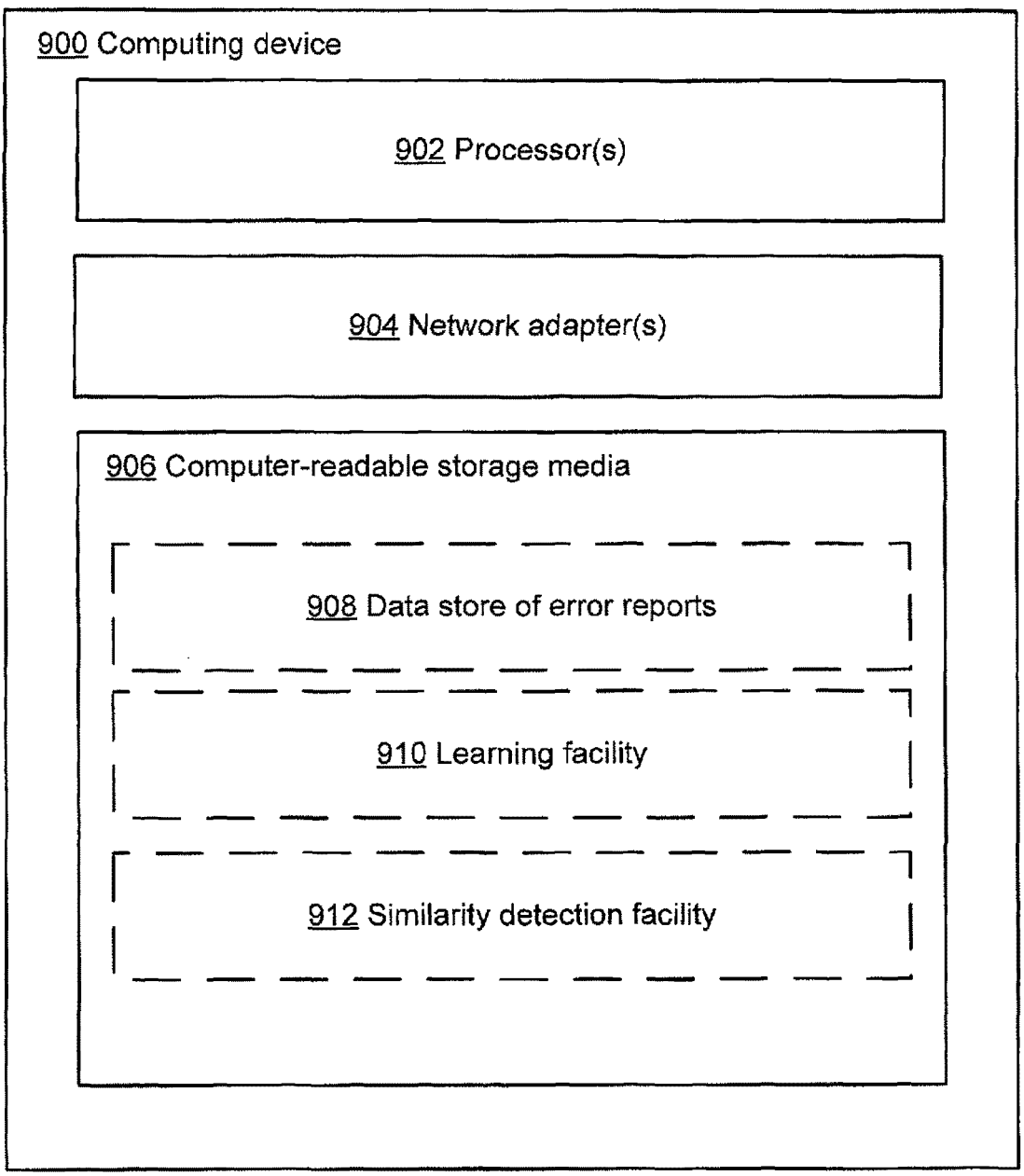
FIG. 9 is a block diagram of one exemplary computing device that may be used to manage error reports in an error reporting system.

FIG. 9 illustrates one exemplary implementation of a computing device in the form of a computing device 900 that may be used in a system implementing the techniques described herein, although others are possible. It should be appreciated that FIG. 9 is intended neither to be a depiction of necessary components for a computing device to operate in accordance with the principles described herein, nor a comprehensive depiction.

Computing device 900 may comprise at least one processor 902, a network adapter 904, and computer-readable storage media 906. Computing device 900 may be, for example, a server computing device or mainframe computing device that may receive error reports and other data and manage a data store (e.g., a database) of error reports. In other embodiments, the computing device 900 may be desktop or laptop personal computer or any other suitable computing device. Network adapter 904 may be any suitable hardware and/or software to enable the computing device 900 to communicate wirelessly with any other suitable computing device over any suitable computing network. The computing network may include a wireless access point as well as any suitable wired and/or wireless communication medium or media for exchanging data between two or more computers, including the Internet. Computer-readable media 906 may be adapted to store data to be processed and/or instructions to be executed by processor 8902. Processor(s) 902 enables processing of data and execution of instructions. The data and instructions may be stored on the computer-readable storage media 906 and may, for example, enable communication between components of the computing device 900.

The data and instructions stored on computer-readable storage media 906 may comprise computer-executable instructions implementing techniques which operate according to the principles described herein. In the example of FIG. 9, computer-readable storage media 906 stores computer-executable instructions implementing various facilities and storing various information as described above. Computer-readable storage media 906 may store a data store 908 of error reports that may have been received from client computing devices as a result of errors and/or may have been reviewed by developers. Computer-readable storage media 906 may further store a learning facility 910 that analyzes labeled error reports that had been reviewed by developers and generates parameters (e.g., weights) that may be used by a similarity detection model to identify similar error reports. A similarity detection facility 912 may also be stored on the computer-readable storage media 912 to apply the similarity detection model to determine a set of one or more similar error reports to a selected error report.

While not illustrated in FIG. 9, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments of the invention have been described where the techniques are implemented in circuitry and/or computer-executable instructions. It should be appreciated that the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A computer-implemented method for determining a similarity between a first error report and a second error report, the similarity being useful to determine whether the first and second error reports were generated by a same error, the method comprising:

operating at least one processor to perform acts of:
- (A) receiving the first error report and retrieving from at least one storage medium the second error report, each error report comprising a callstack and each callstack comprising a series of frames, each frame corresponding to an operation performed by a process;
- (B) comparing a first series of frames for the first error report and a second series of frames for the second error report, including:
  - for each of multiple types of differences between the first series and the second series, counting a number of instances of that particular type of difference; and
  - storing each of the counted number of instances into a memory as respective counts of a set of counts;
- (C) applying a corresponding weight from a set of weights to each count in the set of counts to determine a set of weighted counts;
- (D) summing the set of weighted counts to determine a sum of weighted counts corresponding to a comparison of the first series and the second series; and
- (E) determining the similarity between the first error report and the second error report based at least in part on the sum of weighted counts.

2. The method of claim 1, wherein the method further comprises operating the at least one processor to perform acts of:
- (F) determining at least one comparison result by comparing a value of at least one categorical attribute of the first error report and a value of at least one corresponding categorical attribute of the second error report; and
- (G) applying at least one corresponding categorical attribute weight to the at least one comparison result to determine at least one weighted categorical attribute result, and
wherein the act (E) of determining the similarity comprises determining the similarity based at least in part on a sum of the sum of weighted counts and the at least one weighted categorical attribute result.

3. The method of claim 2, wherein the at least one categorical attribute comprises at least one of a failure type and an exception code, and
wherein the act (F) of determining the at least one comparison result comprises at least one of:
- comparing the failure type of the first error report to the failure type of the second error report; and
- comparing the exception code of the first error report to the exception code of the second error report.

4. The method of claim 2, wherein the act (E) of determining the similarity comprises determining the similarity based at least in part on a sum of a bias term, the sum of weighted counts, and the at least one weighted categorical attribute result.

5. The method of claim 2, wherein the determining the similarity based at least in part on the sum of weighted counts and the at least one weighted categorical attribute result comprises:
- (E1) applying a weighting value to the sum of weighted counts to determine a weighted sum of weighted counts, and
- (E2) determining the similarity based at least in part on the weighted sum of weighted counts and the at least one weighted categorical attribute result.

6. The method of claim 1, wherein each type of difference is from a consisting of:
- inclusion of a first frame in a first frame group of the first error report where the second error report includes the first frame group but does not include the first frame, wherein frame groups are contiguous groups of frames for functions of one module,
- inclusion of a second frame group in the second error report where the first error report does not include the second frame group,
- inclusion of a last frame of a third frame group in the second error report where the first error report includes the third frame group but does not include the last frame,
- reference to different module names between the first error report and the second error report,
- reference to different function calls between the first error report and the second error report where the first error report and the second error report both reference a common module that is referenced by the different function calls, and
- reference to different memory offsets for a common function call between the first error report and the second error report.

7. The method of claim 1, wherein each frame comprises a module name, a function call made by the module, and a memory offset of the function call in memory.

8. The method of claim 1, wherein
the method further comprises operating the at least one processor to perform additional acts of:
- (F) detecting that a developer has labeled at least one error report as similar or dissimilar to another error report, and
- (G) deriving a set of weights from a training set based on the at least one error report such that the set of weights accurately represents the labeling of the developer; and
the act (C) of applying weights comprises weighting each of a first count and a second count by different weights of the set of weights.

9. The method of claim 8, wherein the act (G) of deriving the set of weights comprises performing a logistic regression analysis.

10. The method of claim 1, further comprising operating the at least one processor to perform acts of:
- (F) repeating the acts of comparing, summing, and determining to determine a similarity between the first error report and each of a plurality of third error reports, and
- (G) making available to a user a listing comprising at least a portion of the plurality of third error reports, the portion being those with a similarity above a threshold level.

11. At least one computer-readable storage medium having computer-executable instructions stored thereon for causing a computer to perform a method for determining a similarity between a first error report and a second error report, the similarity being useful to determine whether the first and second error reports were generated by a same error, the method comprising:
- (A) retrieving the first error report and the second error report, each error report comprising a callstack and at least one categorical attribute, and each callstack comprising a series of frames;
- (B) comparing a first series of frames for the first error report and a second series of frames for the second error report, including:
  - for each of multiple types of differences between the first series and the second series, counting a number of instances of that particular type of difference; and
  - storing each of the counted number of instances as respective counts of a set of counts;

(C) applying a corresponding weight from a set of weights to each count of the set of counts to determine a set of weighted counts;

(D) summing the set of weighted counts to determine a sum of weighted counts corresponding to a comparison of the first series and the second series;

(E) determining at least one comparison result by comparing a value of at least one categorical attribute of the first error report and a value of at least one corresponding categorical attribute of the second error report;

(F) applying at least one corresponding categorical attribute weight to the at least one comparison result to determine at least one weighted categorical attribute result;

(G) summing the sum of weighted counts and the at least one weighted categorical attribute result to determine a total sum; and (H) determining a probability of similarity between the two error reports based at least in part on the total sum.

12. The at least one computer-readable storage medium of claim 11, wherein the at least one categorical attribute comprises at least one of a failure type and an exception code, and
wherein the act (E) of determining the at least one comparison result comprises at least one of:
comparing the failure type of the first error report to the failure type of the second error report; and
comparing the exception code of the first error report to the exception code of the second error report.

13. The at least one computer-readable storage medium of claim 11, wherein each type of difference is from a group consisting of:
inclusion of a first frame in a first frame group of the first error report where the second error report includes the first frame group but does not include the first frame, wherein frame groups are contiguous groups of frames for functions of one module,
inclusion of a second frame group in the second error report where the first error report does not include the second frame group,
inclusion of a last frame of a third frame group in the second error report where the first error report includes the third frame group but does not include the last frame,
reference to different module names between the first error report and the second error report,
reference to different function calls between the first error report and the second error report where the first error report and the second error report both reference a common module that is referenced by the different function calls, and
reference to different memory offsets for a common function call between the first error report and the second error report.

14. The at least one computer-readable storage medium of claim 11, wherein each frame comprises a module name, a function call made by the module, and a memory offset of the function call, and
wherein in the act (B) of comparing includes detecting an inclusion of a last frame of a third frame group in the second error report where the first error report includes the third frame group but does not include the last frame.

15. The at least one computer-readable storage medium of claim 11, wherein
the method further comprises:
(I) detecting that a developer has labeled at least one error report as similar or dissimilar to another error report, and (J) deriving a set of weights from a training set based on the at least one error report such that the set of weights accurately represents the labeling of the developer; and
wherein the act (C) of applying weights comprises weighting each of a first count of the set of counts and a second count of the set of counts by different weights of the set of weights.

16. An apparatus comprising:
at least one storage medium encoded with at least a first error report and a second error report, each error report comprising a callstack and at least one categorical attribute, each callstack comprising a series of frames; and
at least one processor adapted to determine a similarity between the first error report and the second error report, the similarity being useful to determine whether the first and second error reports were generated by a same error, by:
retrieving from the at least one storage medium the first error report and the second error report;
determining multiple comparison results by comparing values of categorical attributes of the first error report with corresponding values of categorical attributes of the second error report, wherein determining each of the multiple comparison results includes:
counting a number of differences in values of the particular corresponding categorical attributes;
applying categorical attribute weights to the multiple comparison results to determine multiple weighted categorical attribute results;
determining an edit distance between a first series of frames of the first error report and a second series of frames of the second error report;
summing the multiple weighted categorical attribute results and the edit distance to determine a total sum; and
determining the similarity between the first error report and the second error report based at least in part on the total sum.

17. The apparatus of claim 16, wherein at least one of the multiple categorical attributes comprises at least one of a failure type and an exception code.

18. The apparatus of claim 17, wherein the at least one processor is adapted to apply the weights by applying different weights to a similarity in the type of failure, a similarity in a name of a process, and a similarity in the exception code.

19. The apparatus of claim 16, wherein the at least one processor is adapted to determine the edit distance by:
determining a first count of a number of instances of a first type of difference between the first series and the second series;
determining a second count of another number of instances of a second type of difference between the first series and the second series;
weighting each of the first count and the second count differently to determine a first weighted count and a second weighted count; and
summing the first and second weighted counts to determine a sum of weighted counts.

20. The apparatus of claim 19, wherein each type of difference is from a group consisting of:
inclusion of a first frame in a first frame group of the first error report where the second error report includes the first frame group but does not include the first frame, wherein frame groups are contiguous groups of frames for functions of one module, inclusion of a second frame group in the second error report where the first error report does not include the second frame group, inclusion of a last frame of a third frame group in the second error report where the first error report includes the third frame group but does not include the last frame, reference to different module names between the first error report and the second error report, reference to different function calls between the first error report and the second error report where the first error report and the second error report both reference a common module that is referenced by the different function calls, and reference to different memory offsets for a common function call between the first error report and the second error report.

* * * * *